US012728584B2

(12) United States Patent
Cho et al.

(10) Patent No.: US 12,728,584 B2
(45) Date of Patent: Sep. 8, 2026

(54) ROTATABLE MOLD APPARATUS

(71) Applicants: MOLTEX CO., LTD, Anseong-si (KR); Kia Corporation, Seoul (KR); HYUNDAI MOBIS CO., LTD., Seoul (KR); KBI DONGKOOK IND. CO., LTD., Seoul (KR); Hyundai Motor Company, Seoul (KR)

(72) Inventors: Woo Hyoung Cho, Suwon-si (KR); Jung Joon Park, Anyang-si (KR); Kyu Ha Yoo, Gunpo-si (KR); Kie Moon Sung, Yongin-si (KR); Man Jae Weon, Anseong-si (KR); Young Min Park, Yongin-si (KR); Dong Il Son, Ulsan (KR); Dong Hyuk Choi, Ulsan (KR); Chang Woo Kang, Hwaseong-si (KR); Young Chan Cho, Yongin-si (KR); Young Jin You, Yongin-si (KR)

(73) Assignees: Hyundai Motor Company, Seoul (KR); Kia Corporation, Seoul (KR); MOLTEX Co., LTD, Anseong-Si (KR); KBI DONGKOOK IND. CO., LTD., Seoul (KR); HYUNDAI MOBIS. CO., LTD, Seoul (KR)

( * ) Notice: Subject to any disclaimer, the term of this patent is extended or adjusted under 35 U.S.C. 154(b) by 304 days.

(21) Appl. No.: 18/073,413

(22) Filed: Dec. 1, 2022

(65) Prior Publication Data

US 2023/0373153 A1 Nov. 23, 2023

(30) Foreign Application Priority Data

May 23, 2022 (KR) ........................ 10-2022-0062873

(51) Int. Cl.
*B29C 51/00* (2006.01)
*B29C 33/00* (2006.01)
(Continued)

(52) U.S. Cl.
CPC .............. *B29C 51/22* (2013.01); *B29C 43/00* (2013.01); *B29C 51/082* (2013.01); *B29C 51/36* (2013.01);
(Continued)

(58) Field of Classification Search
CPC ...................................................... B29C 41/06
See application file for complete search history.

(56) References Cited

U.S. PATENT DOCUMENTS 1,921,925 A * 8/1933 Johnson ................. A61C 13/16 425/179
2,136,432 A * 11/1938 Gattuso .................. B29C 41/18 249/91

(Continued)

FOREIGN PATENT DOCUMENTS

CN 108906978 A * 11/2018 ............. B21C 51/00
DE 3782173 T2 2/1993

(Continued)

OTHER PUBLICATIONS

CN-108906978-A (PEng) Nov. 2018(online machine translation), [Retrieved on Jan. 3, 2024]. Retrieved from: Espacenet (Year: 2018).*

*Primary Examiner* — JaMel M Nelson
*Assistant Examiner* — Andrés E. Behrens, Jr.
(74) *Attorney, Agent, or Firm* — Slater Matsil, LLP

(57) ABSTRACT

In an embodiment, a rotatable mold apparatus includes a first mold disposed on a first base structure to be integrally moved together with the first base structure, a second mold disposed on a second base structure to be integrally moved together with the second base structure in order to couple to or decoupled from the first mold, a drive device configured to rotate the first mold and the second mold together when the first mold and the second mold are coupled to each other and support devices rotatably supporting the first mold and (Continued)

the second mold on the first base structure and the second base structure, respectively.

20 Claims, 16 Drawing Sheets

(51) Int. Cl.

| | |
|---|---|
| ***B29C 43/00*** | (2006.01) |
| ***B29C 51/08*** | (2006.01) |
| ***B29C 51/22*** | (2006.01) |
| ***B29C 51/36*** | (2006.01) |
| *B29C 33/30* | (2006.01) |
| *B29C 33/42* | (2006.01) |
| *B29C 43/02* | (2006.01) |
| *B29C 43/04* | (2006.01) |
| *B29C 43/10* | (2006.01) |
| *B29C 43/14* | (2006.01) |
| *B29C 43/18* | (2006.01) |
| *B29C 43/36* | (2006.01) |
| *B29C 43/56* | (2006.01) |
| *B29C 51/10* | (2006.01) |
| *B29C 51/14* | (2006.01) |
| *B29C 51/26* | (2006.01) |
| *B29C 51/42* | (2006.01) |
| *B29C 51/44* | (2006.01) |
| *B29C 59/00* | (2006.01) |
| *B29C 59/02* | (2006.01) |
| *B29L 31/30* | (2006.01) |

(52) U.S. Cl.

CPC .............. *B29C 33/00* (2013.01); *B29C 33/30* (2013.01); *B29C 33/424* (2013.01); *B29C 43/021* (2013.01); *B29C 43/04* (2013.01); *B29C 43/10* (2013.01); *B29C 43/146* (2013.01); *B29C 43/18* (2013.01); *B29C 43/36* (2013.01); *B29C 43/56* (2013.01); *B29C 2043/561* (2013.01); *B29C 51/00* (2013.01); *B29C 51/10* (2013.01); *B29C 51/145* (2013.01); *B29C 51/261* (2013.01); *B29C 51/265* (2013.01); *B29C 51/421* (2013.01); *B29C 51/44* (2013.01); *B29C 59/00* (2013.01); *B29C 59/022* (2013.01); *B29L 2031/3005* (2013.01)

(56) References Cited

U.S. PATENT DOCUMENTS

| | | | | | |
|---|---|---|---|---|---|
| 2,624,072 | A * | 1/1953 | Delacoste | B29C 41/06 | 425/430 |
| 2,745,138 | A * | 5/1956 | Beattie | B29D 11/00413 | 264/2.3 |
| 3,000,056 | A * | 9/1961 | Parsch | B29C 66/8161 | 425/453 |
| 3,015,846 | A * | 1/1962 | Macmillan | B29C 41/04 | 425/453 |
| 3,080,636 | A * | 3/1963 | Zerlaut | B28B 7/0044 | 425/453 |
| 3,309,439 | A * | 3/1967 | Nonweiler | B29C 41/22 | 425/429 |
| 3,555,615 | A * | 1/1971 | Orme | B29C 41/06 | 425/434 |
| 3,611,506 | A * | 10/1971 | Schroeder | B29C 33/202 | 425/434 |
| 3,657,941 | A * | 4/1972 | Engler | F16J 15/50 | 425/233 |
| 3,799,729 | A * | 3/1974 | Hagen | B29C 41/06 | 425/430 |
| 3,856,451 | A * | 12/1974 | Holzinger | B29C 44/428 | 425/429 |
| 4,708,625 | A | 11/1987 | Arend | | |
| 4,722,678 | A * | 2/1988 | Wersosky | B29C 41/18 | 425/435 |
| 5,395,232 | A | 3/1995 | Hori | | |
| 5,919,494 | A | 7/1999 | Swenson | | |
| 6,402,504 | B1 * | 6/2002 | Hahn | B29C 45/06 | 425/576 |
| 8,163,218 | B2 | 4/2012 | Kato et al. | | |
| 9,074,293 | B2 * | 7/2015 | Sung | C25D 1/08 | |
| 2003/0201561 | A1 * | 10/2003 | Linares | B29C 41/14 | 425/429 |
| 2012/0024709 | A1 * | 2/2012 | Sung | C25D 1/10 | 205/70 |
| 2017/0001350 | A1 * | 1/2017 | Ahn | B29C 45/2628 | |
| 2017/0144361 | A1 * | 5/2017 | Hills | B29C 51/266 | |

FOREIGN PATENT DOCUMENTS

| | | | | |
|---|---|---|---|---|
| DE | 69121237 T2 | 2/1997 | | |
| EP | 1958744 A1 * | 8/2008 | | B28B 1/26 |
| JP | 2003291146 A | 10/2003 | | |
| JP | 4902785 B2 | 3/2012 | | |
| KR | 100790794 B1 | 1/2008 | | |
| KR | 200439549 Y1 | 4/2008 | | |
| KR | 101002968 B1 | 12/2010 | | |
| KR | 200469877 Y1 | 11/2013 | | |
| KR | 101691167 B1 | 12/2016 | | |
| WO | WO-2009031983 A1 * | 3/2009 | | B28B 7/08 |
| WO | WO-2021061082 A2 * | 4/2021 | | B28B 1/261 |

* cited by examiner

ROTATABLE MOLD APPARATUS

CROSS-REFERENCE TO RELATED APPLICATIONS

This application claims the benefit of Korean Patent Application No. 10-2022-0062873, filed on May 23, 2022, which application is hereby incorporated herein by reference.

TECHNICAL FIELD

The present disclosure relates to a mold device and, more particularly, to a mold apparatus able to mold products having a variety of shapes irrespective of the design, shape, skin-specific elongation, and the like of products.

BACKGROUND

A plurality of interior materials molded from resin is used in vehicles. For example, such interior materials may include a crash pad, an instrument panel, a door trim, a pillar trim, a headliner, and the like.

Since interior materials are used as finishing materials determining the appearance of the interior of a vehicle, interior materials should be fabricated to provide an exterior surface providing luxuriousness in aesthetics, tactile sensation, and the like. In addition, interior materials should be fabricated in consideration of functions, such as a cushioning function and a shock absorbing function, as required.

For example, a crash pad disposed in the front part of a vehicle interior is required to be fabricated to exhibit an aesthetic surface state in the appearance while having an elastic cushioning function and shock absorbing performance. In this regard, the crash pad may be fabricated in a laminated structure in which a hard core serving as a skeletal structure, a foam layer providing an elastic cushioning function and a shock absorbing performance, and a skin for improving the outer appearance are stacked on each other.

Among such interior materials, the surface of the skin is the surface of a final interior product. An embossed pattern may be formed on the surface of the skin in order to improve the appearance quality and the luxuriousness of the product.

A fabrication process will be described with reference to FIG. 1. First, a skin 1 is heated to a high temperature in a heating device 11, and a laminate of the skin 1 and a foam layer 2 is input between a lower mold 13 onto which a core 3 is injection-molded and an upper mold 12.

Subsequently, the lower mold 13 is moved upward and the upper mold 12 is moved downward. Afterwards, in an assembled state (i.e., a mold-closed state) in which the upper mold 12 and the lower mold 13 are coupled, the core 3, the foam layer 2, and the skin 1 between the upper mold 12 and the lower mold 13 are heated and pressed.

Here, vacuum molding is performed so that the embossed shape of the molds (i.e., the upper mold) is transferred to the surface of the skin 1. Afterwards, when the molding is completed, a molded product 4 is removed from the molds. In this manner, the molded product 4 having an intended shape in which the skin 1, the foam layer 2, and the core 3 are integrally stacked and bonded may be completed.

After a concave-convex structure for embossment transfer is formed on the inner surface of the upper mold 12 defining a molding cavity of the molds for molding the product 4, embossments are formed on the surface of the skin 1 using the concave-convex structure on the inner surface of the molds in the vacuum molding.

In addition, in the related art, as illustrated in FIG. 2, the molds for molding a product, i.e., the upper mold 12 and the lower mold 13, are configured to move up and down to predetermined mold setting angles in order to mold the product.

In this case, in portions requiring a high level of elongation depending on the shape of a product, a predetermined mold setting angle, the skin material (i.e., a skin fabric), product defects, such as damage to the skin, may frequently occur due to low elongation.

In order to overcome such problems, new molds may be fabricated or the shape of products or the shape of molds may be changed. In the process of changing or altering the molds to prevent molding defects, a significant cost may be incurred, thereby causing excessive cost loss, which is problematic.

The foregoing is intended merely to aid in the understanding of the background of the present disclosure, and is not intended to mean that the present disclosure falls within the purview of the related art that is already known to those skilled in the art.

SUMMARY

Embodiments provide a mold apparatus able to mold products having a variety of shapes irrespective of the design, shape, skin-specific elongation, and the like of products.

Further embodiments provide an improved mold apparatus which does not require a modification, change, or fabrication of molds for preventing a molding defect in a product, which can prevent a mold investment cost, improve the degree of freedom of the design and shape of molds, and reduce a mold cost, and which can reduce an investment cost by molding a product from a plurality of skin materials (i.e., fabrics) having different levels of elongation.

Embodiments are not limited to the aforementioned description, and other embodiments not explicitly disclosed herein will be clearly understood by persons having ordinary skill (hereinafter, referred to as "those skilled") in the art from the description provided hereinafter.

Embodiments provide a rotatable mold apparatus including: a first mold disposed on a first base structure to be integrally moved together with the first base structure; a second mold disposed on a second base structure to be integrally moved together with the second base structure so as to be decoupled from or coupled to the first mold; a drive device configured to rotate the first mold and the second mold together in a state in which the first mold and the second mold are coupled to each other; and support devices rotatably supporting the first mold and the second mold on the first base structure and the second base structure, respectively.

According to an embodiment, the first mold may be a lower mold to be vertically moved up and down, the second mold may be an upper mold to be vertically moved up and down, and a material to be molded may be input between the lower first mold and the upper second mold in a mold-opened state in which the first mold and the second mold are decoupled from each other.

The first base structure may include a first base plate horizontally disposed below the first mold. The second base structure may include a second base plate horizontally disposed above the second mold.

The support devices may include: a first support device disposed between the first base structure and the first mold to rotatably support the first mold on the first base structure;

and a second support device disposed between the second base structure and the second mold to rotatably support the second mold on the second base structure.

The first support device may include: a support block fixed to the first base structure; a guide block fixed to the support block; and a rotating block fixed to the first mold and coupled to the support block and the guide block, with bearings being interposed between the rotating block and the support block and between the rotating block and the guide block, to support the rotating first mold while sliding on the support block and the guide block.

A support surface of the support block may be a curved surface having a shape of a concave arc. A plurality of first bearings may be provided on the support block to be arranged on the are along the support surface, with at least a portion of each of the first bearings protruding from the support surface. The rotating block may include a curved slide surface having a shape of a convex arc such that the rotating block slides in a state in which the curved slide surface thereof is seated on the plurality of first bearings.

The rotating block may include an arc-shaped guide groove. A second bearing may be provided on the guide block to be inserted into and coupled to the guide groove so as to support the rotating block.

An indicator may be provided on the guide block. A scale may be provided on the first mold. A pointer of the indicator may indicate a graduation of the scale corresponding to an angle to which the first mold is currently rotated.

The indicator may have a hole through which a bolt extends. The first mold may have a fastening hole to which the bolt extending through the hole of the indicator is fastened. In a state in which the rotation of the first mold and the second mold is completed, the first mold may be fixed to the indicator by the bolt extending through the hole of the indicator and fastened to the fastening hole of the first mold.

The second support device may include: a support block fixed to the second base structure; a guide block fixed to the support block; and a rotating block fixed to the second mold and coupled to the support block and the guide block, with bearings being interposed between the rotating block and the support block and between the rotating block and the guide block, to support the rotating first mold while sliding on the support block and the guide block.

A support surface of the support block may be a curved surface having a shape of a concave arc. A plurality of first bearings may be provided on the support block to be arranged on the are along the support surface, with at least a portion of each of the first bearings protruding from the support surface. The rotating block may include a curved slide surface having a shape of a convex arc such that the rotating block slides in a state in which the curved slide surface thereof is seated on the plurality of first bearings.

The rotating block may include an arc-shaped guide groove. A second bearing may be provided on the guide block to be inserted into and coupled to the guide groove so as to support the rotating block.

An indicator may be provided on the guide block, and a scale may be provided on the second mold. A pointer of the indicator may indicate a graduation of the scale corresponding to an angle to which the second mold is currently rotated.

The indicator may have a hole through which a bolt extends. The second mold may have a fastening hole to which the bolt extending through the hole of the indicator is fastened. In a state in which the rotation of the first mold and the second mold is completed, the second mold may be fixed to the indicator by the bolt extending through the hole of the indicator and fastened to the fastening hole of the second mold.

The drive device may include: a screw shaft horizontally disposed to be supported on the first base structure by means of a bracket and configured to receive rotating force; a nut member engaged with the screw shaft; a moving block fixed to the nut member to move together with the nut member; a guide rail disposed on the first base structure and parallel to the screw shaft, wherein the moving block is coupled to the guide rail such that movement of the moving block is guided by the guide rail; and a pivot shaft disposed on the first mold, wherein the pivot shaft coupled to the moving block allows the first mold to rotate in response to the movement of the moving block.

A handle may be provided on the screw shaft to apply rotating force thereto, or a motor shaft may be connected to the screw shaft to apply rotating force thereto.

The moving block may have a vertically extending recess. The pivot shaft may be rotatably inserted into the recess of the moving block and be movable along the recess of the moving block.

In the rotatable mold apparatus according to embodiments, it is possible to mold products having a variety of designs and shapes from a plurality of skin materials (i.e., fabrics) having different levels of elongation using a single mold apparatus by rotating molds and changing a setting angle of molds, thereby significantly reducing a mold cost and an investment cost. In addition, a modification, change, or fabrication of molds for preventing a molding defect in a product is not required. It is possible to prevent a mold investment cost, improve the degree of freedom of the design and shape of molds, and reduce a mold cost.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF ILLUSTRATIVE EMBODIMENTS

Figure 1:
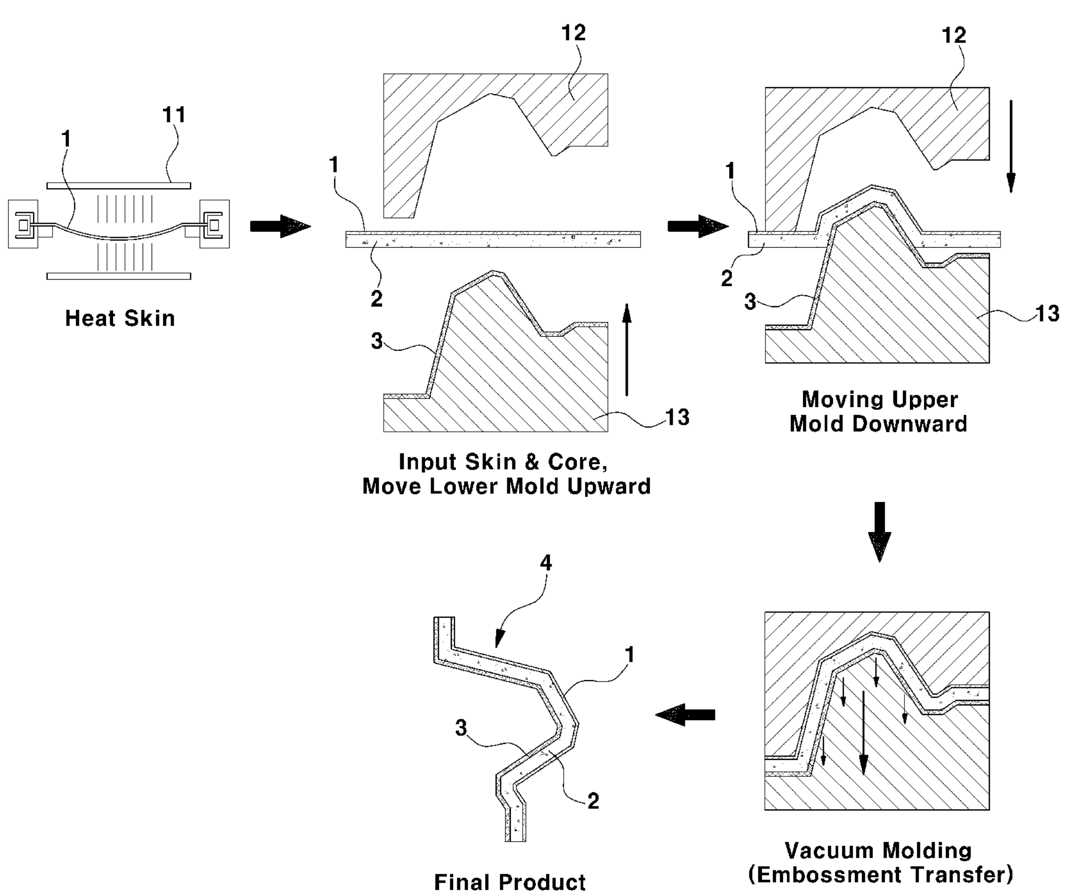
FIG. 1 is a schematic view illustrating a process of molding an interior material of the related art.
Figure 2:
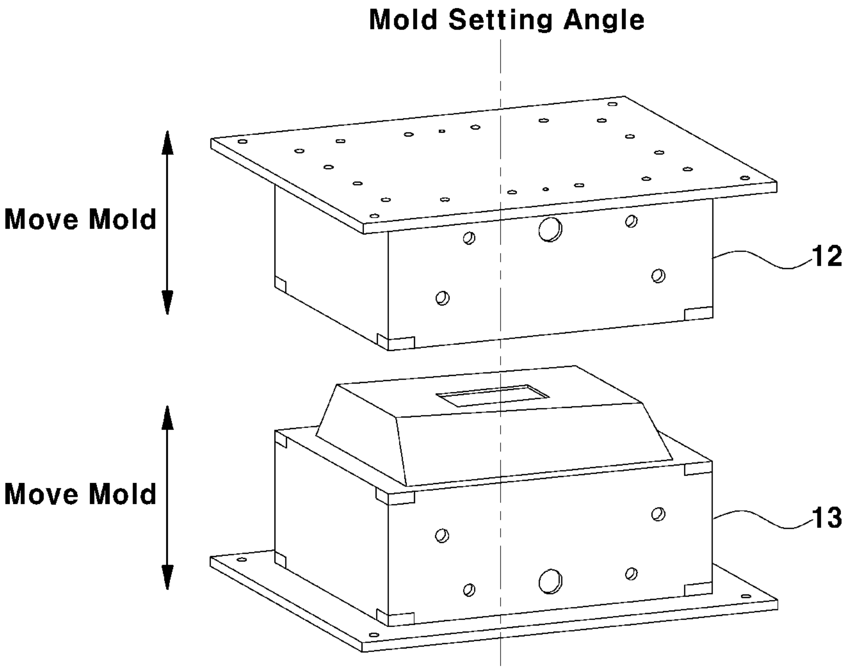
FIG. 2 is a schematic perspective view illustrating a mold apparatus for molding an interior material of the related art.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. In addition, the present disclosure is intended to cover not only the exemplary embodiments, but also various alternatives, modifications, equivalents, and other embodiments that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

Throughout the specification, the same reference numerals will refer to the same or like parts. The terminologies used herein are for the purpose of describing particular embodiments only and are not intended to limit the present disclosure. As used herein, singular forms are intended to include plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, embodiments of the present disclosure will be described in detail with reference to the accompanying drawings.

The present disclosure relates to a mold apparatus able to fabricate products having a variety of shapes without a molding defect irrespective of the design, shape, skin-specific elongation, and the like of molded products.

The present disclosure relates to a rotatable mold apparatus able to prevent defects in skin molding in portions in which high elongation is required. A single rotatable mold apparatus is configured to mold products by variously changing the angle of molding through the rotation of molds according to the design, the shape, the required elongation, and the like of the molded products.

In the rotatable mold apparatus according to the present disclosure, a modification, change, or fabrication of molds for preventing a molding defect in a product is not required. It is possible to prevent a mold investment cost, improve the degree of freedom of the design and shape of molds, and reduce a mold cost. It is possible to reduce an investment cost by molding a product from a plurality of skin materials (i.e., fabrics) having different levels of elongation.

Figure 3:
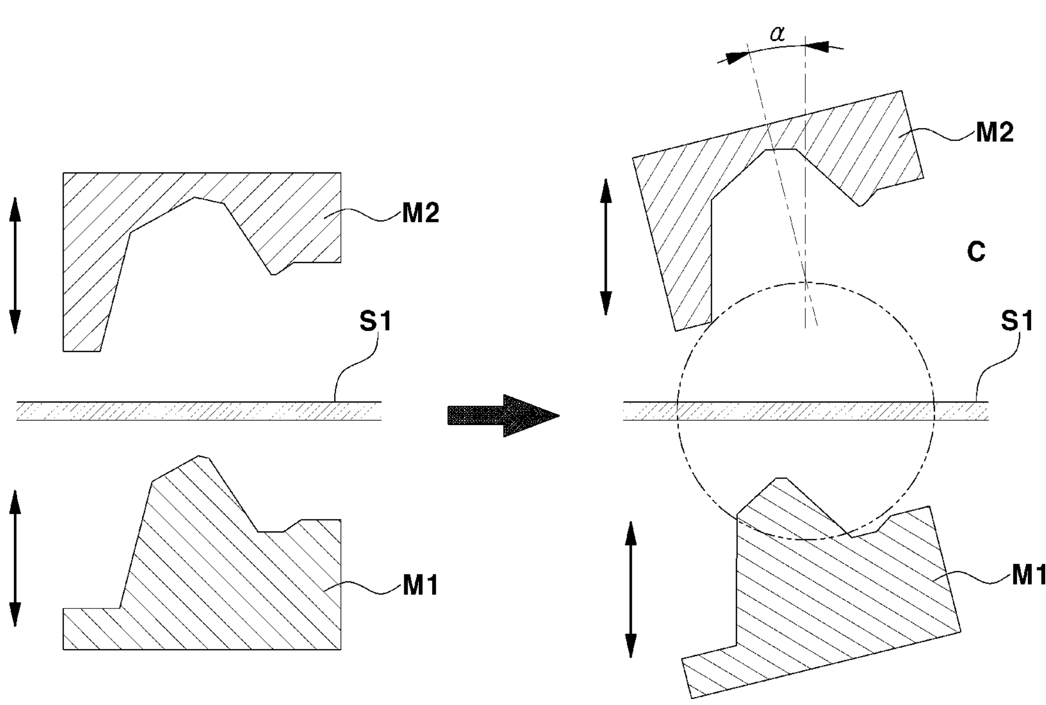
FIG. 3 is a comparison view illustrating a mold apparatus.

FIG. 3 is a comparison view illustrating a mold apparatus. As illustrated in the left part of FIG. 3, in the mold apparatus of the related art, a lower mold M1 and an upper mold M2 are only movable at a predetermined mold setting angle. The mold setting angle is fixed and instead of being adjustable.

In contrast, as illustrated in the right part of FIG. 3, in the mold apparatus of the present disclosure, it is possible to adjust a mold setting angle $\alpha$ by rotating the lower mold M1 and the upper mold M2 in a mold-closed state. Here, the mold setting angle $\alpha$ may be an angle, i.e., a tilt angle, to which the lower mold M1 and the upper mold M2 are tilted with respect to a vertically extending virtual line. Referring to the right part of FIG. 3, a circle indicating the radius of rotation of the lower mold M1 and the upper mold M2 is depicted.

The mold apparatus of the present disclosure is configured to mold a product with an intended shape by applying heat and pressure to the product in a mold-closed state, i.e., a state in which the lower mold M1 and the upper mold M2 are coupled. In addition, the mold apparatus of the present disclosure may be used to mold a product having the shape of a plate or a sheet, and moldable products may include vehicle interior materials. Specifically, moldable products may include a crush pad, an instrument panel, a door trim, a pillar trim, a headliner, and the like.

In addition, products that may be molded using the mold apparatus of the present disclosure may include a molded product having a structure in which a hard core of a skeletal structure, a foam layer configured to provide an elastic cushion function and a shock absorbing function, an appearance improving skin are stacked. In general, vehicle interior materials are configured such that the core, the foam layer, and the skin are stacked on each other.

In addition, the mold apparatus of the present disclosure may be used to mold a skin material, i.e., a skin fabric that has not been molded, into a skin having an intended shape. That is, products that may be molded using the mold apparatus of the present disclosure may be interior materials or skins. Here, when a material to be molded is the skin, the unmolded state of the product may be a flat fabric state (e.g., a textile fabric state), and the molded state of the product may be a skin state that has been molded into and maintains an intended shape.

In addition, when a material to be molded is a product in which the skin, the foam layer, and the core are integrally stacked on each other, the product may be molded by molding the core with an intended shape using a separate mold apparatus and then inputting the core into the mold apparatus of the present disclosure, and then inputting a laminate of a skin fabric and the foam layer into the mold apparatus of the present disclosure.

In this case, the core may be disposed on the lower mold M1 (i.e., a first mold in the following). In addition, the laminate of the skin fabric and the foam layer is positioned between the lower mold M1 and the upper mold M2 (i.e., a second mold in the following), the lower mold M1 and the upper mold M2 are moved up and down to close the molds, and then heat and pressure are applied to the skin fabric and the foam layer through the molds so that the skin fabric and the foam layer are integrally stacked and coupled to the core while being molded into the same shape as the core. Afterwards, the molds are opened, and the resultant product is removed from the mold apparatus.

In the mold apparatus of the present disclosure, in a mold setting process before the molding process, the lower mold M1 and the upper mold M2 are rotated to the same angle and set to the same tile angle. Afterwards, during the molding process or when the molds are opened in the product removal process or are closed, the two molds M1 and M2 are only moved up or down without additional rotation while maintaining the tilt angle to which the two molds M1 and M2 are rotated in the mold setting process.

Figure 4:
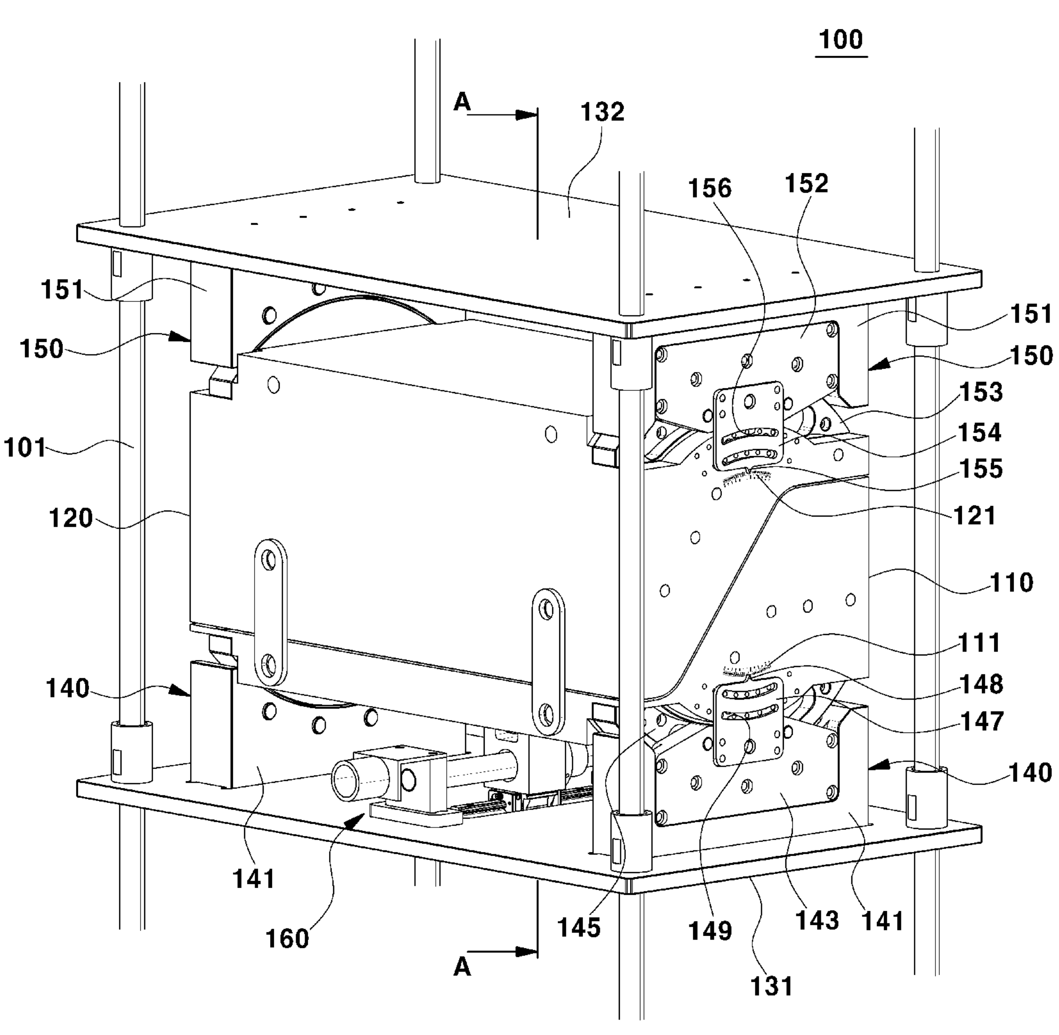
FIG. 4 is a perspective view illustrating a mold apparatus according to an embodiment of the present disclosure.
Figure 5A:
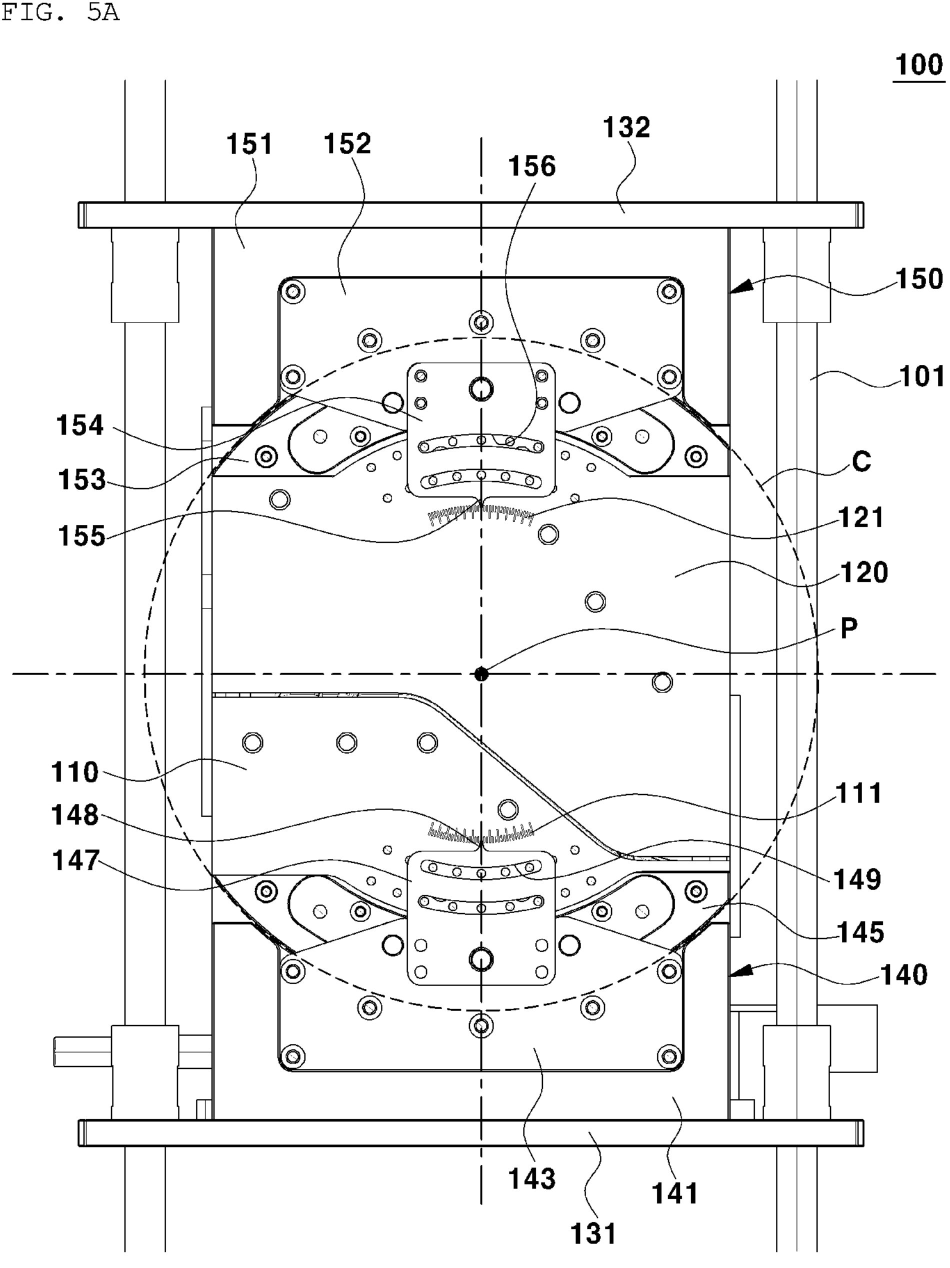
FIGS. 5A to 5C are side views illustrating the mold apparatus according to an embodiment of the present disclosure.
Figure 5B:
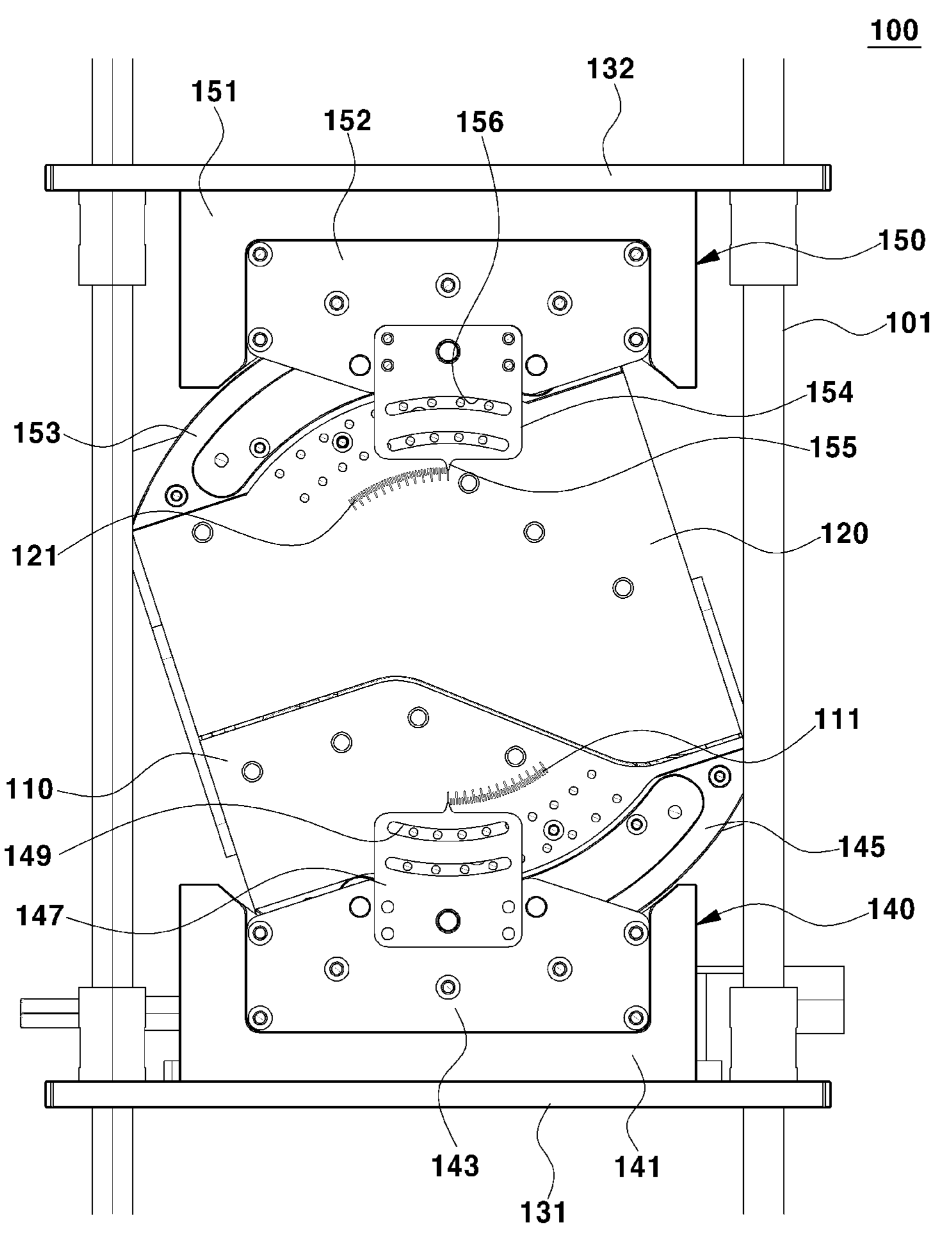
Figure 5C:
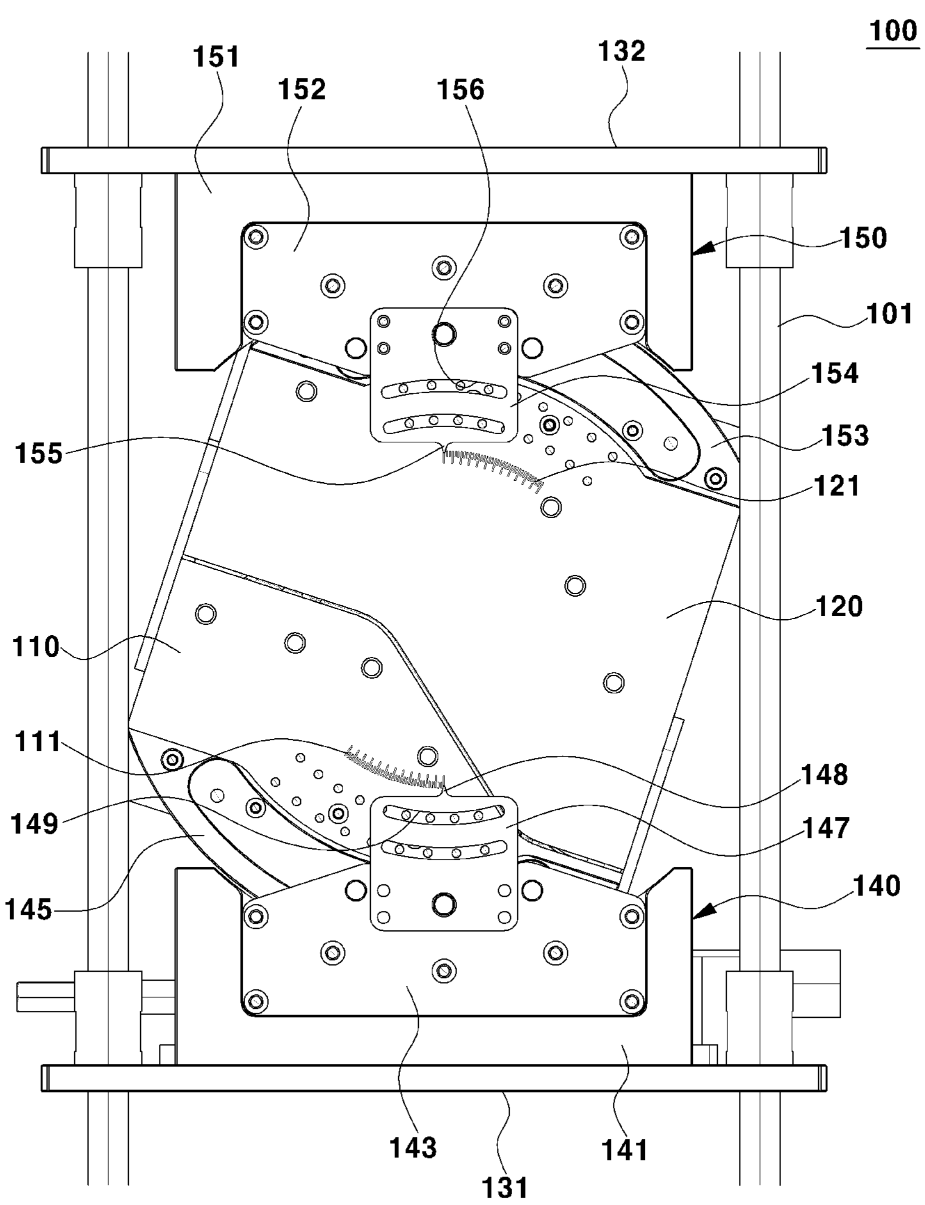
Figure 6:
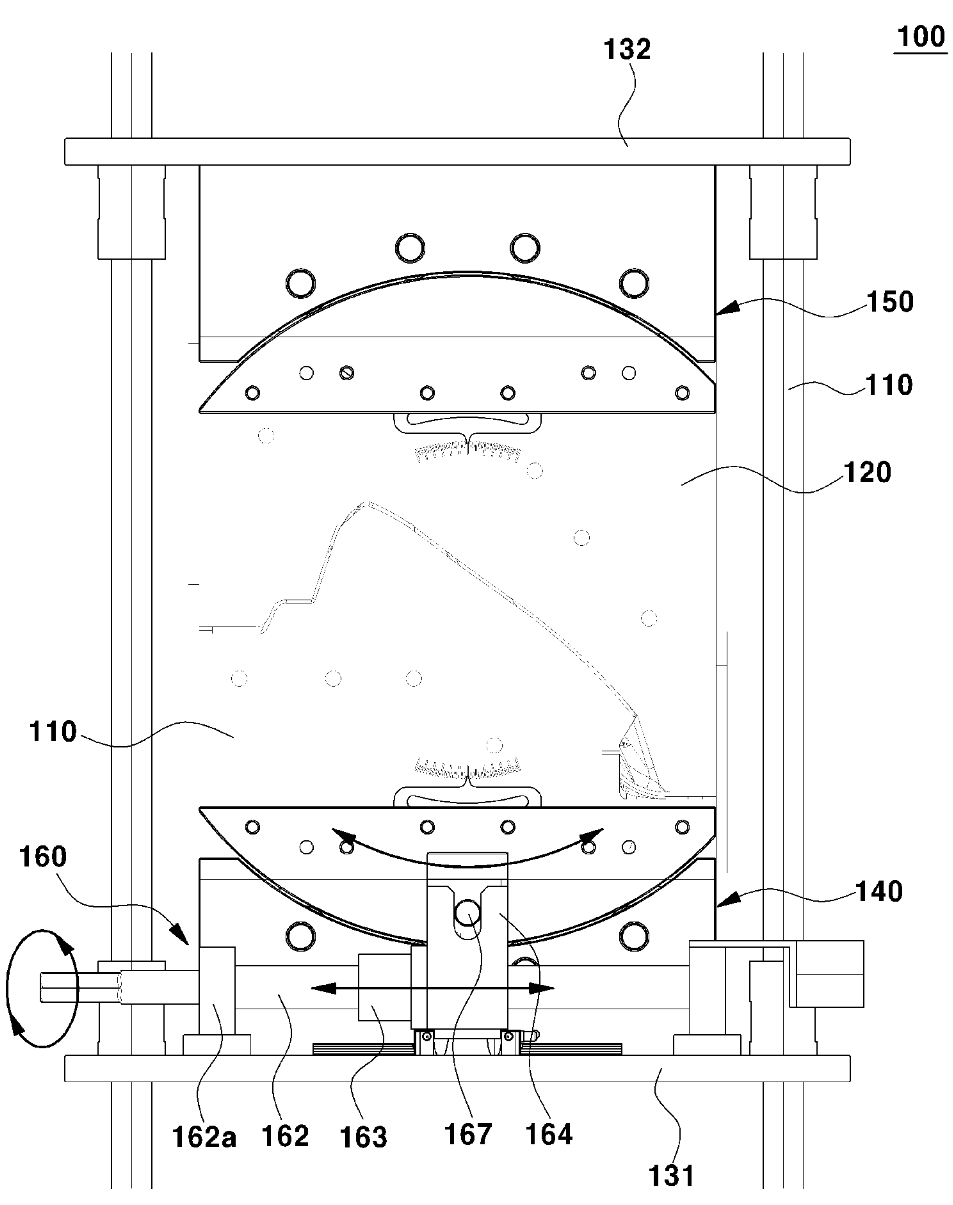
FIG. 6 is a cross-sectional view taken along A-A' part in FIG. 4.

FIG. 4 is a perspective view illustrating a mold apparatus according to an embodiment of the present disclosure, FIGS. 5A to 5C are side views illustrating the mold apparatus according to an embodiment of the present disclosure, and FIG. 6 is a cross-sectional view taken along A-A' part in FIG. 4. In the mold apparatus 100 according to an embodiment of the present disclosure, a drive device 160 and a pivot shaft 167 of a first mold 110, i.e., a lower mold, coupled to the drive device 160 are illustrated.

As illustrated in FIGS. 4 to 6, the mold apparatus 100 according to an embodiment of the present disclosure includes the first mold 110 and a second mold 120. The first mold 110 may be a lower mold disposed in a lower position, whereas the second mold 120 may be an upper mold disposed in an upper position.

In the mold apparatus 100 according to an embodiment of the present disclosure, in a mold-closed state, i.e., a state in which the lower first mold 110 and the upper second mold 120 are coupled to each other, the first mold 110 and the second mold 120 are rotatable about the central point P of the mold apparatus 100. Here, the central point P of the mold apparatus 100 is the central point of the entirety of the first mold 110 and the second mold 120 coupled to each other in the mold-closed state (see FIGS. 5A to 5C).

FIG. 5A illustrates a state in which the first mold 110 and the second mold 120 are not rotated, and FIGS. 5B and 5C illustrate a state in which the first mold 110 and the second mold 120 coupled to each other, i.e., in the mold-closed state, are rotated about the central point P of the mold apparatus 100.

As illustrated in FIGS. 5B and 5C, when the first mold 110 and the second mold 120 in the closed state are rotated, the central point P of the mold apparatus 100 serving as the center of rotation of the first mold 110 and the second mold 120 may be the central point of a virtual circle C defined by the bottom surface of the first mold 110 and the top surface of the second mold 120 when, during the rotation, the bottom surface of the first mold 110 slides on a fixed structure (i.e., a guide block of a first support device to be described later) and the top surface of the second mold 120 slides on a fixed structure (i.e., a guide block of a second support device to be described later).

In comparison with the non-rotated state of FIG. 5A, the rotated state of FIG. 5B is a state in which the first mold 110 and the second mold 120 coupled to each other is rotated in the counterclockwise direction, and the rotated state of FIG. 5C is a state in which the first mold 110 and the second mold 120 coupled to each other is rotated in the direction opposite to the direction of FIG. 5B. This rotated state may be the tilted state in which the first mold 110 and the second mold 120 are tilted, differently from the state of FIG. 5A.

Unlikely, the tilt angle to which the first mold 110 and the second mold 120 are tilted may be an angle to which the first mold and the second mold are rotated about the central point P. In the following description, the tilt angle (i.e., the angle of rotation) refers to an angle to which the mold is inclined (i.e., tilted) with respect to the non-rotated state, as well as an angle to which the mold is inclined or rotated in the counterclockwise direction or the clockwise direction with respect to the vertically extending virtual line.

The first mold 110 and the second mold 120 may be rotated in the counterclockwise direction as in FIG. 5B or in the clockwise direction opposite to the counterclockwise direction as in FIG. 5C. The angle inclined in one of the counterclockwise direction and the clockwise direction may be referred to as a positive (+) tilt angle. For example, the angle rotated (or tilted) in the counterclockwise direction as in FIG. 5B may be defined to be a positive (+) tilt angle. Here, when the first mold 110 and the second mold 120 is rotated in the clockwise direction as in FIG. 5C, the angle of rotation (i.e., inclination) is referred to as a negative (−) tilt angle.

In addition, the mold apparatus 100 according to an embodiment of the present disclosure further includes support devices 140 and 150 rotatably supporting the first mold 110 and the second mold 120 on base structures 131 and 132, respectively, and the drive device 160 rotating the first mold 110 and the second mold 120 coupled to each other.

Here, the base structures supporting the molds include the first base structure 131 supporting the first mold 110 by means of the first support device 140 and the second base structure 132 supporting the second mold 120 by means of the second support device 150. The first base structure 131 is connected to a first mold transfer device (not shown) that moves the first mold 110 up and down. The second base structure 132 is connected to a second mold transfer device (not shown) that moves the second mold 120.

In addition, the first base structure 131 may be a plate-shaped structure, i.e., a first base plate, connected to the first mold transfer device. The first base plate 131 is configured to be moved vertically up and down using the first mold transfer device, the operation of which is controlled by a control signal from a controller (not shown).

The second base structure 132 may be a plate-shaped structure, i.e., a second base plate, connected to the second mold transfer device. The second base structure 132 is configured to be moved up and down using the second mold transfer device, the operation of which is controlled by a control signal from a controller (not shown).

In addition, as illustrated in FIGS. 4 to 6, the first base plate 131 may be horizontally disposed below the second mold 120, whereas the second base plate 132 may be horizontally disposed above the second mold 120. Here, the first mold 110 is disposed above the first base plate 131 so as to be rotatably supported by the first support device 140.

In the same manner, the second mold 120 is disposed below the second base plate 132 so as to be rotatably supported by the second support device 150. Here, the second mold 120 is provided as a structure coupled to and supported on the first base plate 132 by means of the second support device 150 so as not remain coupled to the second base plate 132 instead of being decoupled downward from the second base plate 132 by gravity.

The first base plate 131 and the second base plate 132 may be coupled to guide shafts 101 extending vertically up and down. Here, the guide shafts 101 serve to guide upward-downward movement of the first base plate 131 and the second base plate 132.

That is, each of the first base plate 131 and the second base plate 132 is moved up and down along the guide shafts 101. While the first base plate 131 and the second base plate 132 are being guided by the guide shafts 101, the upward-downward movement of the first base plate 131 and the second base plate 132 may be stably performed.

Figure 7:
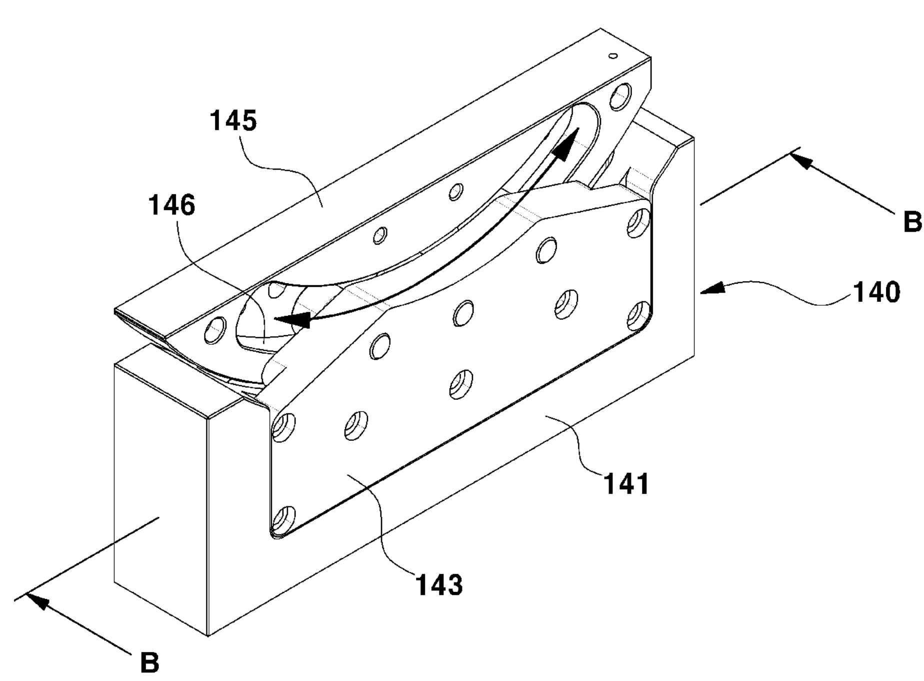
FIG. 7 is a perspective view illustrating the configuration of a first support device in the mold apparatus according to an embodiment of the present disclosure.
Figure 8:
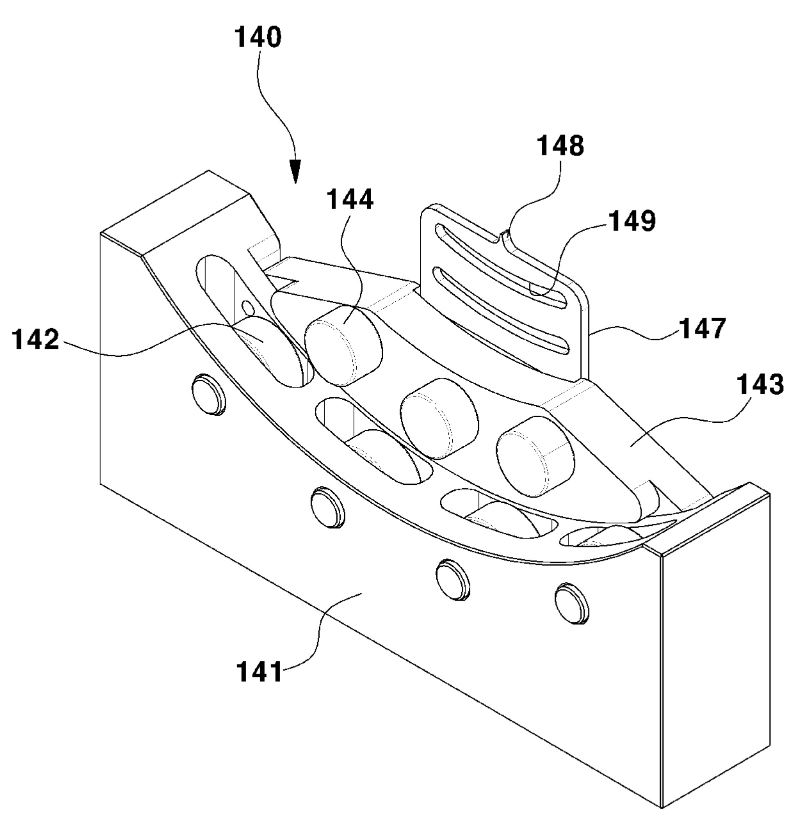
FIG. 8 is a perspective view illustrating the coupled state of the support block and the guide block of the first support device in the mold apparatus according to an embodiment of the present disclosure.

FIG. 7 is a perspective view illustrating the configuration of the first support device in the mold apparatus according to an embodiment of the present disclosure, and FIG. 8 is a perspective view illustrating the coupled state of a support block and a guide block of the first support device in the mold apparatus according to an embodiment of the present disclosure.

The first support device 140 includes a support block 141 fixedly disposed on the first base plate 131, a guide block 143 integrally coupled to the support block 141, and a rotating block 145 fixedly disposed on the bottom of the first mold 110 and coupled to the support block 141 and the guide block 143, with bearings 142 and 144 being interposed between the rotating block 145 and the support and guide blocks 141 and 143, respectively.

The support block 141 is a block supporting the first mold 110 by means of the rotating block 145 while being fixedly disposed on top of the first base plate 131. The top surface of the support block 141 is a surface supporting the rotating block 145. Here, the support surface, the top surface of the support block 141, is a curved surface having the shape of a concave arc. In addition, a plurality of first bearings 142 is disposed in the upper portion of the support block 141.

The plurality of first bearings 142 is disposed on the upper portion of the support block 141 so as to be arranged in the arc. Here, each of the bearings 142 is disposed such that at least a portion thereof protrudes upward from the top surface (i.e., support surface) of the support block 141 having the shape of a concave curved surface. Respective ones of a plurality of bearings 142 protrude to the same height from the top surface of the support block 141. Thus, respective ones of a plurality of bearings 142 are arranged in the form of an arc in the upper portion of the support block 141.

The rotating block 145 is supported on the support block 141 while being raised on top of the support block 141. Specifically, the rotating block 145 is supported while being seated on the plurality of bearings 142 disposed in the upper portion of the support block 141. Here, the bottom surface of the rotating block 145 is a surface on which the bearings 142 slide while being seated and supported.

In addition, the slide surface, the bottom surface of the rotating block 145, is a curved surface having the shape of a downwardly concave arc. A guide groove 146 having the shape of an are is formed in a side surface of the rotating block 145, in particular, a side surface of the rotating block 145 facing the top side surface of the guide block 143.

Thus, the downwardly convex bottom surface of the rotating block 145 is slidably supported on top of the rotating block 145 by the plurality of bearings 142 while being seated on the plurality of bearings 142. That is, when the first mold 110 is rotated, the plurality of bearings 142 allows the bottom surface of the rotating block 145 to slide on top of the support block 141.

The guide block 143 is integrally and fixedly coupled to the side surface of the support block 141. In the state in which the guide block 143 is fixed to the support block 141, the guide block 143 supports the rotating block 145 in the direction opposite to the support block. In this regard, the plurality of second bearings 144 are provided on the side portion of the guide block 143. The second bearings 144 are provided on the side portion of the guide block 143 so as to be arranged in an arc. That is, the plurality of second bearings 144 is disposed on the side surface of the guide block 143 so as to be arranged in an arc.

In addition, in the state in which the guide block 143 is coupled to the side portion of the support block 141, the second bearings 144 of the guide block 143 are positioned in the upper portion of the support block 141 or above the first bearings 142. Here, the second bearings 144 of the guide block 143 are spaced apart predetermined distances from the top surface of the support block 141 and the first bearings 142.

In addition, in the state in which the rotating block 145 fixedly disposed on the lower portion of the first mold 110 is coupled to the support block 141 and the guide block 143, the bottom surface of the rotating block 145 is seated on the first bearings 142 of the support block 141. Here, the second bearings 144 of the guide block 143 are inserted into and coupled to the guide groove 146 of the rotating block 145.

Figure 9A:
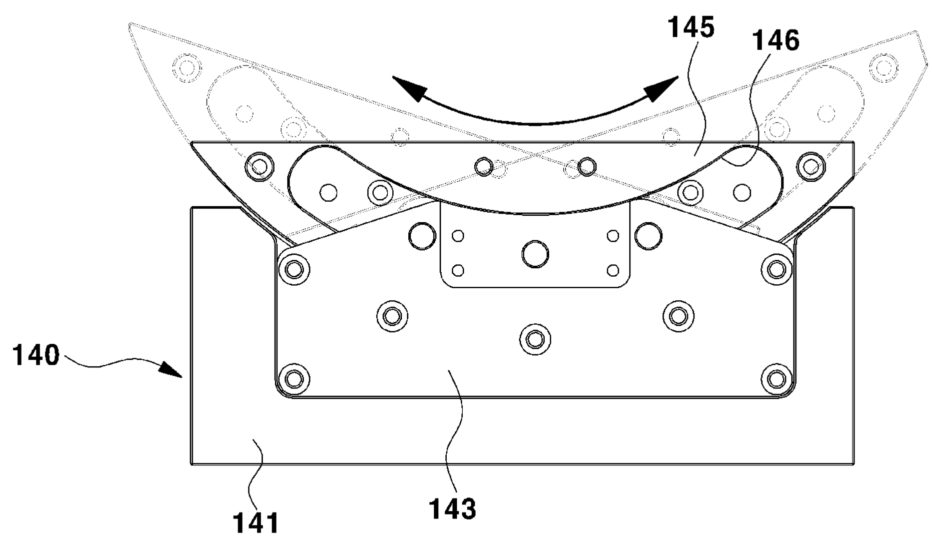
FIGS. 9A and 9B illustrate the operating state of the rotating block during the rotation of the first mold in the mold apparatus according to an embodiment of the present disclosure.
Figure 9B:
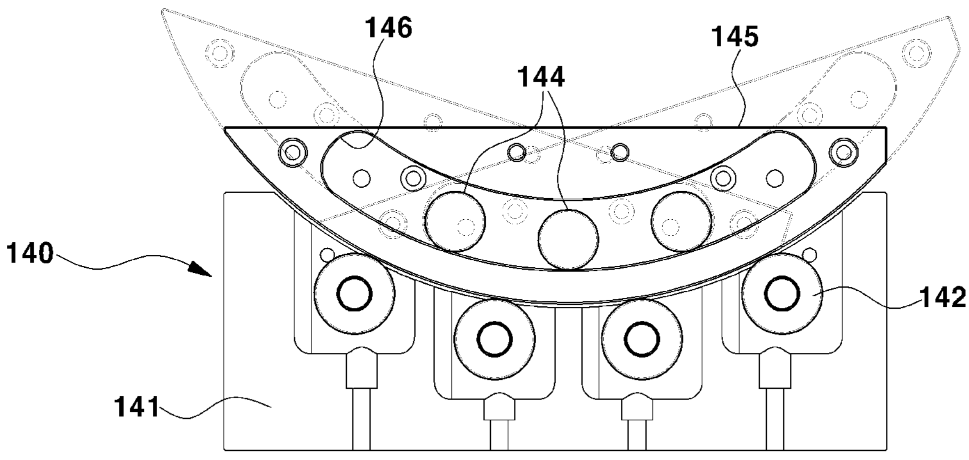

FIGS. 9A and 9B illustrate the operating state of the rotating block during the rotation of the first mold, in which FIG. 9A is a side view illustrating the operating state of the rotating block together with the guide block, and FIG. 9B is a cross-sectional view taken along line B-B in FIG. 7.

When the first mold 110 is rotated, as illustrated in FIGS. 9A and 9B, the bottom surface of the rotating block 145 slides along the top surface of the support block 141 by means of the bearings 142. Here, the second bearings 144 disposed on the guide block 143 roll along the inner surface of the guide groove 146 while being inserted into the guide groove 146. Consequently, the rotation of the rotating block 145 may be guided by the guide block 143.

In this manner, the first mold 110 may be rotatably supported on the first base plate 131 by means of the first support device 140. Here, the first mold 110 may slide while rotating on the support block 141 fixed to the first base plate 131 and the guide block 143 by means of the integrally coupled structure of the rotating block 145 and the bearings 142 and 144.

Hereinabove, the first support device including the support block, the guide blocks, the rotating block, and the first and second bearings has been described. A plurality of support blocks 141, a plurality of guide blocks 143, and a plurality of rotating blocks 145 of the first support device 140 may be disposed below the first mold 110. That is, the same assembles each comprised of the support block 141, the guide block 143, the rotating block 145, and the bearings 142 and 144 may be disposed on the left side and the right side below the first mold 110.

For example, assemblies having the same configuration, structure, and coupled state and respectively including a single support block 141, a single guide block 143, and a single rotating block 145 may be disposed between the first mold 110 and the first base plate 131 in order to support the left end portion and the right end portion of the first mold 110, respectively.

In FIG. 8, reference numeral 147 refers to an indicator fixedly disposed on the guide block 143 to indicate the tilt angle (i.e., the angle of rotation) of the first mold 110. The indicator 147 is disposed to protrude upward from the guide block 143. In this case, the indicator 147 may be fixed to a side surface of the guide block 143. In addition, a scale 111 is provided on a lower side surface of the first mold 110. Thus, in a state in which the first mold 110 is rotated, a pointer 148 of the indicator 147 indicates a graduation of the scale 111 corresponding to the amount of rotation and the tilt angle of the first mold 110.

In an embodiment of the present disclosure, the indicator 147 may also serve as a locking means to fix the first mold 110 in the rotated position so as not to further rotate. That is, after the graduation indicated by the pointer 148 of the indicator 147 is recognized, when the first mold 110 is rotated to an intended tilt angle, a plurality of bolts (not shown) is inserted through holes 149 formed in the indicator 147 and fastened to fastening holes (not shown) formed in the first mold 110.

In this case, the head of each of the bolts presses against the outer surface of the indicator 147. In this state, the indicator 147 is fixed to the first mold 110 by the bolts. As a result, the first mold 110 is fastened to the guide block 143 by means of the indicator 147. Due to such bolt fastening, the first mold 110 is not further rotated and completely fixed.

Meanwhile, the general configuration of the second support device 150 is not different from that of the first support device 140. That is, the second support device 150 includes a support block 151 fixedly disposed on the second base plate 132, a guide block 152 integrally coupled to the support block 151, and a rotating block 153 fixedly disposed in the upper portion of the second mold 120 and coupled to the support block 151 and the guide block 152 by means of bearings (not shown).

However, the second support device 150 is different from the first support device in that the second support device 150 is configured to be disposed on the bottom surface of the second base plate 132 to support the second mold 120 positioned below the second support device 150, instead of supporting the first base plate 131 and the first mold 110.

The support block 151, the guide block 152, the rotating block 153, and the first and second bearings (not shown) of the second support device 150 are substantially the same as the support block 141, the guide block 143, the rotating block 145, the first bearings 142, and the second bearings 144 of the first support device 140 in terms of the shape, the coupling states between the components, and the like, except that the configuration of the second support device 150 is inverted upside down from the configuration of the first support device 140.

Thus, descriptions of the configuration of the second support device 150, the coupling state between and structures of the second support device 150 and the second base plate 132, the coupling state between and structures of the second support device 150 and the second mold 120, and the like will be omitted.

In addition, those skilled in the art will fully understand the operating states of the rotating block 153, the support block 151, and the guide block 152 of the second support device 150 during the rotation of the second mold 120 by inferring from the above description of the operating states of the first support device 140, and thus detailed descriptions thereof will be omitted.

Like FIGS. 9A and 9B, when the second mold 120 is rotated, the top surface of the rotating block 153 slides on the bottom surface of the support block 151 by means of the first bearings. At this time, the second bearings disposed in the guide block 152 role along the inner surface of the guide groove while remaining inserted into the guide groove of the rotating block 153. Consequently, the rotation of the rotating block 153 may be guided by the guide block 152.

In this manner, the second mold 120 may rotatably support the second base plate 132 by means of the second support device 150. That is, since the rotating block 153 fixed to the second mold is supported by the support block 151 fixed to the second base plate 132 and the guide block 152, the second mold 120 may be supported on the second base plate 132. Here, since the rotating block 153 may slide on the support block 151 and the guide block 152 by means of the first bearings (not shown) and the second bearings (not shown), the second mold 120 may also rotate.

Like the first support device 140, the second support device 150 may also include a plurality of support blocks 151, a plurality of guide blocks 152, and a plurality of rotating blocks 153 disposed at a plurality of positions above the second mold 120. That is, the same assemblies each comprised of the support block 151, the guide block 152, and the rotating block 153 may be disposed on the left side and the right side above the second mold 120, respectively.

For example, assemblies having the same configuration, structure, and coupled state and respectively including a single support block 151, a single guide block 152, and a single rotating block 153 may be disposed between the second mold 120 and the second base plate 132 in order to support the left end portion and the right end portion of the second mold 120, respectively.

Figure 10:
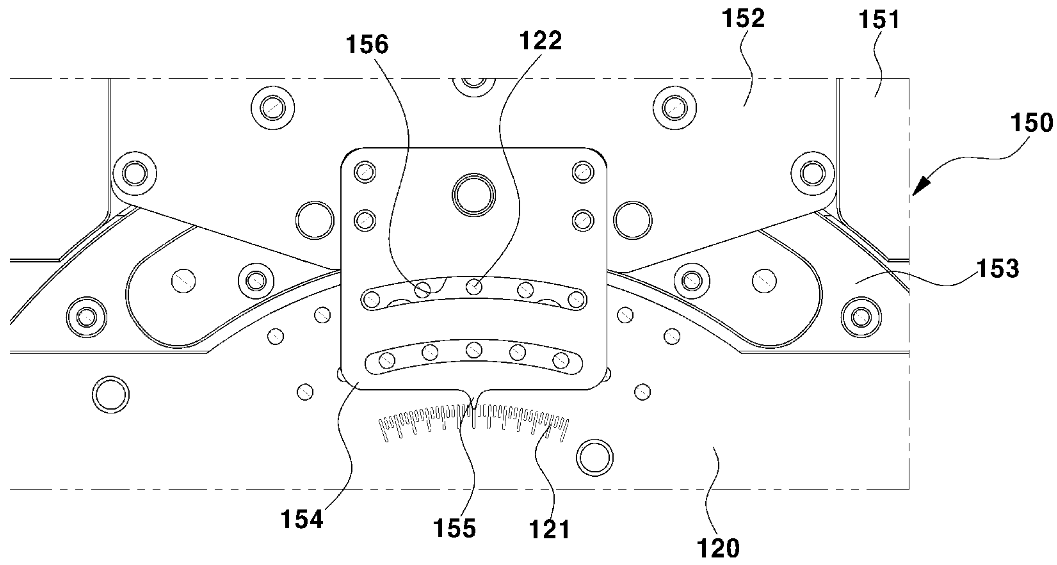
FIG. 10 is a view illustrating an indicator and a scale indicating the tile angle (i.e., the angle of rotation) of the second mold in the mold apparatus according to an embodiment of the present disclosure.

FIG. 10 is a view illustrating an indicator 154 and a scale 121 indicating the tile angle (i.e., the angle of rotation) of the second mold 120. The indicator 154 is disposed to protrude downward from the guide block 152. Here, the indicator 154 may be fixed to a side surface of the guide block 152. In addition, a scale 121 is provided on an upper side surface of the second mold 120. Thus, in a state in which the second mold 120 is rotated, a pointer 155 of the indicator 154 indicates a graduation of the scale 121 provided on the upper side surface of the second mold 120, corresponding to the amount of rotation and the tilt angle of the second mold 120.

Like the indicator 147 of the first support device 140, the indicator 154 of the second support device 150 may also serve as a locking means to fix the second mold 120 in the rotated state so as to not further rotate. That is, when the graduation indicated by the pointer 155 of the indicator 154 is recognized, when the second mold 120 is rotated to an intended tilt angle, a plurality of bolts (not shown) is inserted through holes 156 formed in the indicator 154 and fastened to fastening holes (not shown) formed in the second mold 120.

In this case, the head of each of the bolts presses against the outer surface of the indicator 154. In this state, the indicator 154 is fixed to the second mold 120 by the bolts. As a result, the second mold 120 is fastened to the guide block 152 by means of the indicator 154. Due to such bolt fastening, the second mold 120 is not further rotated and completely fixed.

Figure 11:
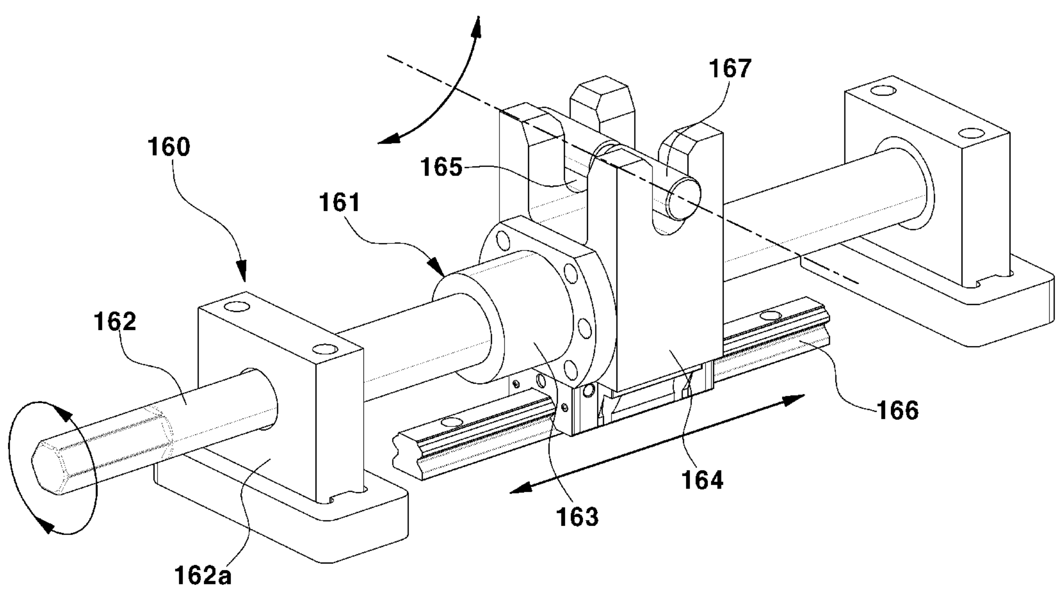
FIG. 11 is a perspective view illustrating the drive device in the mold apparatus according to an embodiment of the present disclosure.

Next, FIG. 11 is a perspective view illustrating the drive device in the mold apparatus according to an embodiment of the present disclosure. The drive device 160 is a device driving the first mold 110 and the second mold 120 in the coupled state to rotate. The drive device 160 may be disposed between the first mold 110 and the first base plate 131. Here, the drive device 160 may be disposed between the first support devices 140 disposed on the left side and the right side below the first mold 110, and be disposed at a transverse center position (i.e., a middle position between the right and left support devices) below the first mold 110.

In the mold-closed state in which the first mold 110 and the second mold 120 are coupled to each other, when the first mold 110 is rotated, the second mold 120 is also rotated. Thus, the drive device 160 may also rotate the second mold 120 by rotating the first mold 110 on the first base plate 131. That is, it is possible to simultaneously rotate the first mold 110 and the second mold 120 to the same angle using the single drive device 160 disposed between the first base plate 131 and the first mold 110.

As illustrated in FIG. 11, the drive device 160 includes a ball screw 161, a moving block 164, a guide rail 166, and a pivot shaft 167. In the drive device 160, on the first base plate 131, the ball screw 161 converted rotation into reciprocal linear motion of the moving block 164 so as to move the pivot shaft 167 fixedly disposed on the first mold 110 together with the moving block 164.

During the movement of the pivot shaft 167 in this manner, the first mold 110 may be rotated counterclockwise or clockwise depending on the direction of movement of the pivot shaft 167 while being supported above the first base plate 131 by the first support device 140.

In the drive device 160, the ball screw 161 includes a screw shaft 162 disposed on the top surface of the first base plate 131 to be horizontally supported by a bracket 162*a* and a nut member 163 engaged to the screw shaft 162. Here, the moving block 164 is integrally coupled to the nut member 163. The moving block 164 is slidably coupled to the guide rail 166 extending in the front-back direction on the top surface of the first base plate 131, i.e., elongated in the direction of movement of the moving block 164.

In addition, the screw shaft 162 of the ball screw 161 is an elongated shaft disposed above the first base plate 131 and the below the first mold 110 to horizontally extend in the front-back direction. The guide rail 166 is disposed above the first base plate 131 and parallel to the screw shaft 162.

Thus, when the nut member 163 is reciprocally moved in the front-back direction above the first base plate 131 and the below the first mold 110 by the screw shaft 162, the moving block 164 may be reciprocally moved in the front-back direction together with the nut member 163 while being guided by the guide rail 166.

The ball screw 161 may properly rotate the heavy first mold 110 due to the rolling of balls (not shown) interposed between the screw shaft 162 and the nut member 163, even in the case in which small torque is applied to the screw shaft. Since the stick-slip phenomenon is not caused, precise movement of the nut member 163 and the moving block 164 may be accurately performed.

The pivot shaft 167 is coupled to the top portion of the moving block 164 in a vertically movable and rotatable manner. In an embodiment of the present disclosure, vertically extending recesses 165 are formed in the upper portion of the moving block 164, and the pivot shaft 167 is inserted into the recesses 165 so as to be vertically movable in the longitudinal direction of the recesses 165. The pivot shaft 167 may be disposed in a position below the first mold 110 and horizontally in the transverse direction. The pivot shaft 167 may be configured such that both ends thereof are supported on the bottom central portion of the first mold 110 by means of brackets (not shown).

Although a handle or a motor is not illustrated in FIGS. 6 and 11, a handle may be integrally mounted on one end of the screw shaft 162 of the ball screw 161 in the drive device 160 (manual configuration), or a motor shaft of a motor, the operation of which is controlled by a controller, may be integrally coupled to one end of the screw shaft 162 of the ball screw 161 in place of the handle (electric configuration). In this case, the motor may be mounted on a first base bracket.

Thus, in the case of the manual configuration in which the handle is provided, when an operator rotates the screw shaft 162 by holding the handle, the rotation of the screw shaft 162 is converted into reciprocal linear movement of the nut member 163. At this time, as the nut member 163 moves along the screw shaft 162, the moving block 164 may move along with the nut member 163.

During the front-back movement of the moving block 164 of the screw shaft 162 in this manner, the moving block 164 pushes or pulls the pivot shaft 167, and due to pivot movement at this time, the bottom end of the first mold 110 is pushed or pulled. Consequently, the first mold 110 may be rotated counterclockwise or clockwise while being supported on the first base structure 131 by means of the first support device 140.

The electric configuration in which the motor is disposed uses substantially the same operating mechanism in which the first mold 110 is rotated counterclockwise or clockwise as the pivot shaft 167 is pushed or pulled by rotating force applied to the screw shaft 162, except that the screw shaft 162 is rotated using the motor.

As described above, the drive device 160 is disposed between the first base plate 131 and the first mold 110, in particular, so as to be coupled to the bottom surface of the first mold 110. When the drive device 160 is provided on a side of the molds, the problem of a limited space may occur due to interference with a set of skin fabric inputting equipment.

In addition, when the drive device 160 is provided at a vertical center position of the molds, a rotation shaft (i.e., a pivot shaft) should be disposed on one side due to the matching portions of the lower second mold 120 and the upper first mold 110, thereby causing a problem in that the matching portions of the lower second mold 120 and the upper first mold 110 are unmatched. In addition, due to the molding pressure in the molding, the angle may be altered or the unmatched problem of the upper and lower matching portions may occur.

Accordingly, as described above, the drive device 160 may be disposed below the first mold 110, in particular, at the transverse center position below the first mold 110. Consequently, the spatial limitation can be minimized, and even in the case in which the molding pressure is generated in the molds, the molding pressure can be managed using the base structure such as the first base plate 131 below the molds.

Figure 12A:
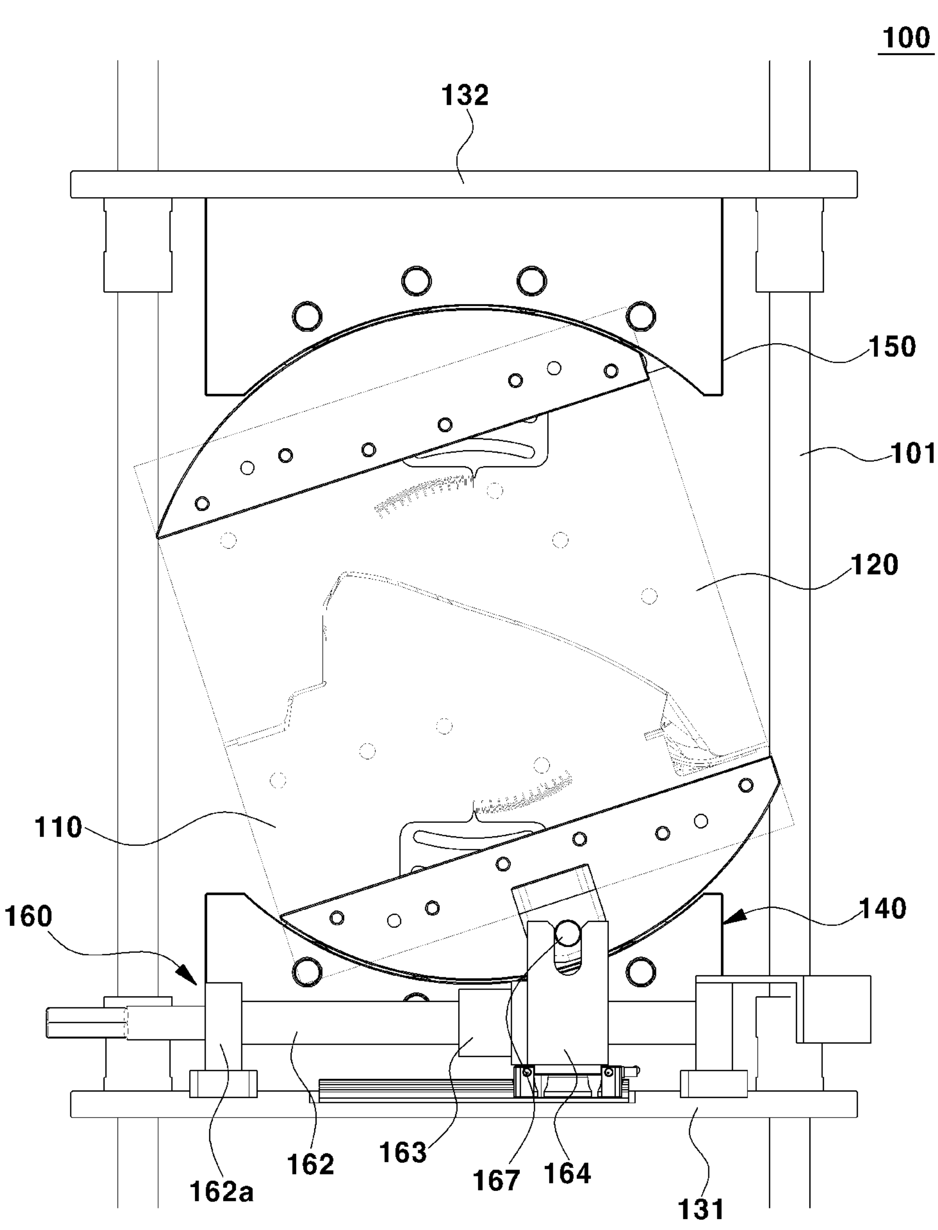
FIGS. 12A and 12B illustrate rotated states of the first mold and the second mold in the mold apparatus according to an embodiment of the present disclosure.
Figure 12B:
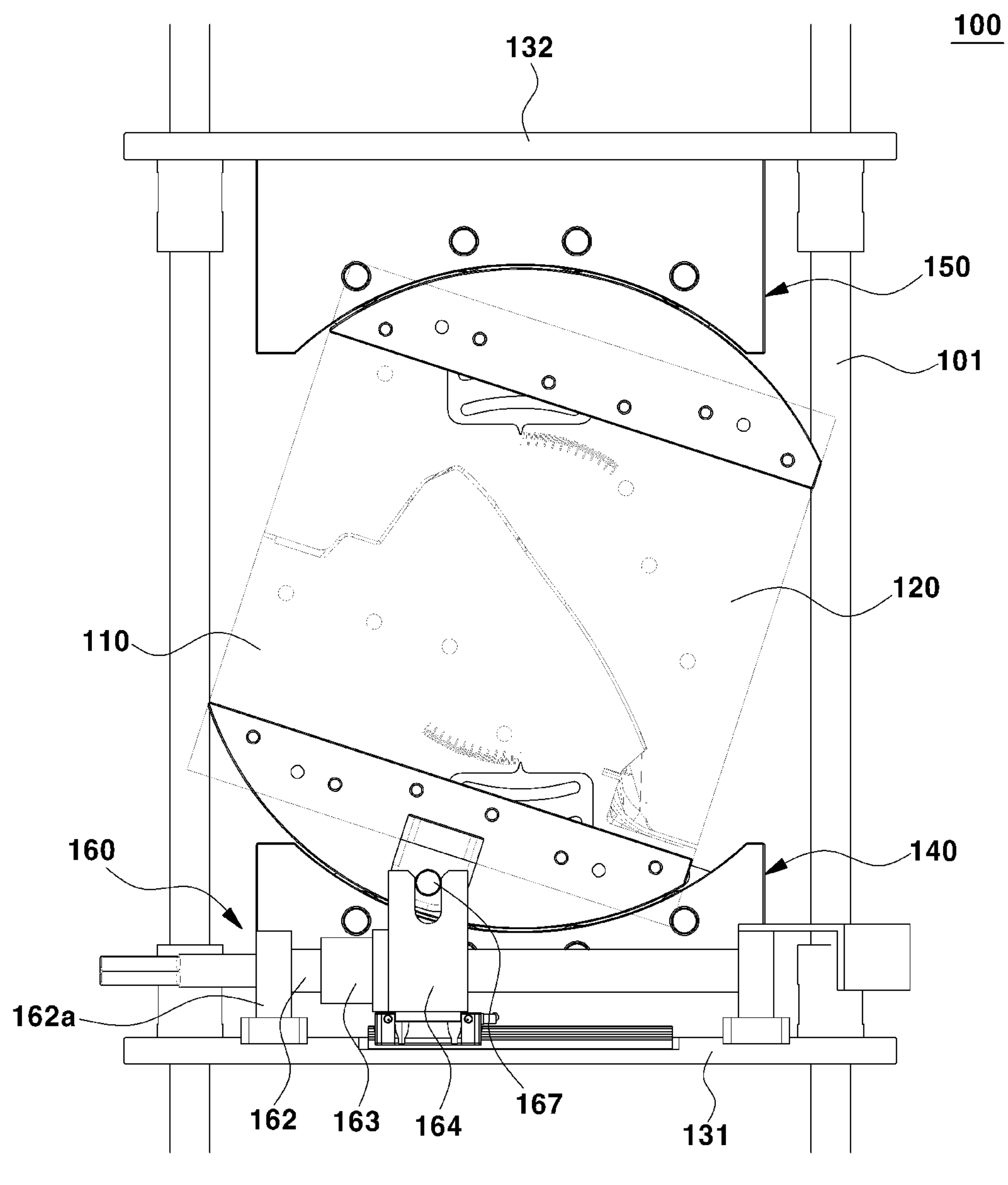

FIGS. 12A and 12B are cross-sectional views taken along line A-A in FIG. 4 to illustrate rotated states of the first mold and the second mold in the mold apparatus according to an embodiment of the present disclosure, in which FIG. 12A illustrates the state rotated to a positive (+) tilt angle, and FIG. 12B illustrates the state rotated to a negative (−) tilt angle. The state rotated to the positive (+) tilt angle refers to a state in which the first mold 110 and the second mold 120 are rotated counterclockwise in the figure, whereas the state rotated to the negative (−) tilt angle refers to a state in which the first mold 110 and the second mold 120 are rotated clockwise in the figure.

As illustrated, in the mold apparatus 100 according to an embodiment of the present disclosure, in the mold-closed state in which the first mold 110 and the second mold 120 are coupled to each other, the first mold 110 and the second mold 120 may be rotated counterclockwise and clockwise within a predetermined range of angle by the support devices and the drive device 160.

In addition, in the mold-closed state, after the first mold 110 and the second mold 120 is rotated to an intended tilt angle, the indicators 147 and 154 are fastened to the molds using bolts as described above, thereby locking the first mold 110 and the second mold 120 in a non-rotatable manner. That is, although the first mold 110 or the second mold 120 is not further rotated without operating the drive device 160, when the indicators 147 and 154 are fastened to the molds using bolts, the molds can be completely fixed to the base plates 131 and 132 by means of the support devices 140 and 150, respectively.

Here, the intended tilt angle is a mold setting angle determined in consideration of the elongation required depending on the material or type of a material to be molded (e.g., a skin fabric), the design, shape, or size of a material to be molded, and the like.

Since the operating mechanism in which the first mold 110 and the second mold 120 are rotated by the drive device 160 and the corresponding support devices 140 and 150 when the screw shaft 162 of the drive device 160 is rotated using the handle or the motor has been described above, further description thereof will be omitted.

When the tilt angle (i.e., the mold setting angle) of the first mold 110 and the second mold 120 is finally set, the lower first mold 110 is moved vertically downward by the first mold transfer device (not shown) while maintaining the tilt angle, and the upper second mold 120 is moved vertically upward by the second mold transfer device (not shown) while maintaining the tilt angle. Consequently, the two molds may be separated and be in a mold-opened state.

Afterwards, in the mold-opened state, a material to be molded (e.g., a skin fabric) is introduced to be horizontally placed between the first mold 110 and the second mold 120. Thereafter, in the mold-closed state in which the first mold 110 and the second mold 120 are coupled to each other, heat and pressure may be applied through the molds, thereby molding an intended product.

When the mold-opened state is moved to the mold-closed state or, conversely, the mold-closed state is moved to the mold-opened state, the first mold 110 and the second mold 120 are only moved vertically upward and downward by the corresponding mold transfer devices while maintaining the tilt angle without any operation of the corresponding support devices 140 and 150 or the drive device 160.

When the tilt angle is finally set in this manner, the first mold 110 and the second mold 120 are moved vertically upward and downward while maintaining the tilt angle during a process of inputting and molding a material to be molded and a process of removing a molded product (from the molds).

When the first mold 110 is moved up and down by the first mold transfer device, the horizontally disposed first base plate 131 may be moved and guided up and down along the guide shafts 101. In the same manner, when the second mold 120 is moved up and down by the second mold transfer device, the second base plate 132 may also be moved and guided up and down along the guide shafts 101.

Figure 13:
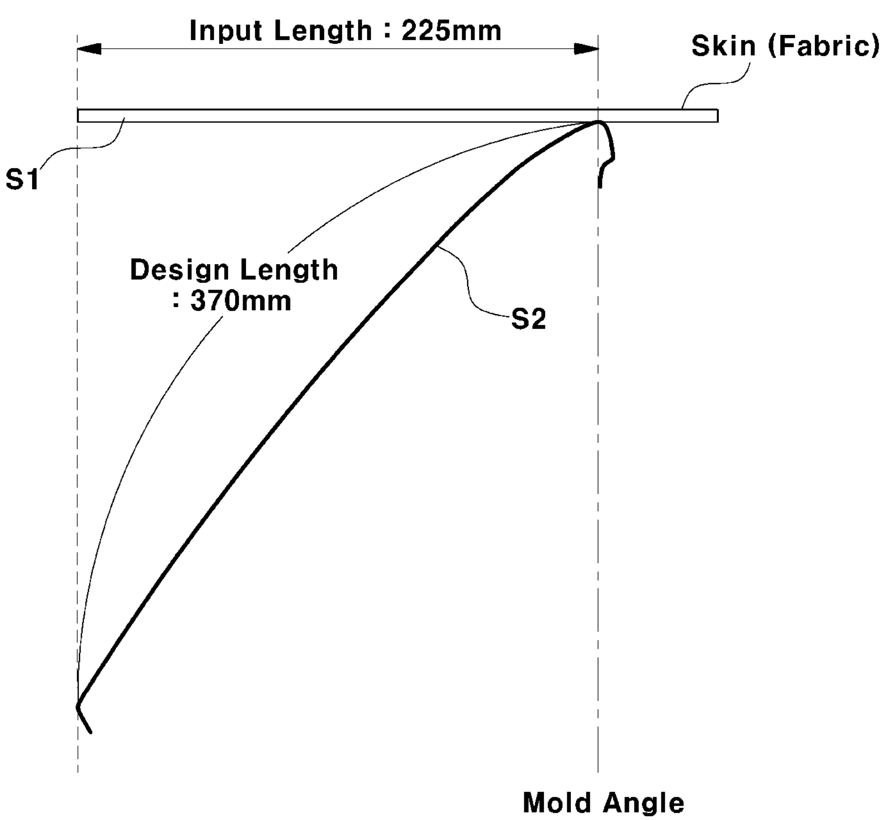
FIG. 13 is a schematic view illustrating the definition of elongation in the mold apparatus according to an embodiment of the present disclosure.
Figure 14:
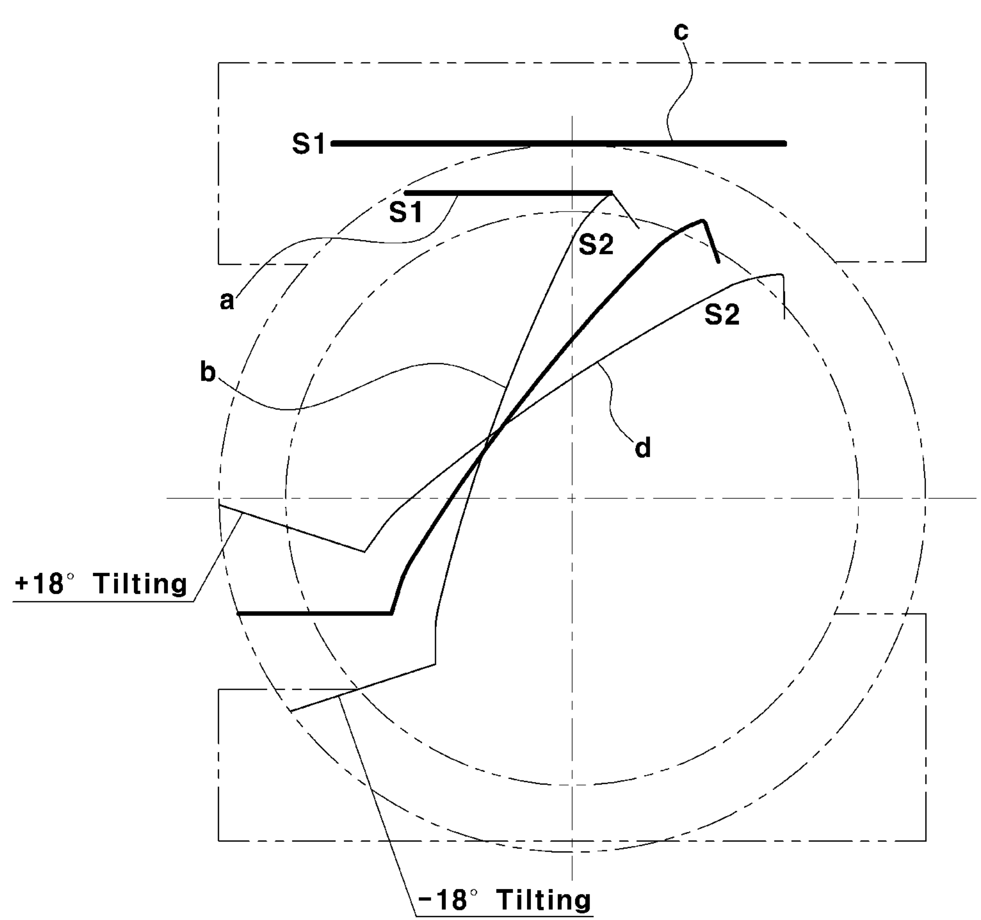
FIG. 14 is a schematic view illustrating that elongation may be changed by the rotation of molds in the mold apparatus according to an embodiment of the present disclosure.

FIG. 13 is a schematic view illustrating the definition of elongation in the mold apparatus according to an embodiment of the present disclosure. FIG. 14 is a schematic view illustrating that elongation may be changed by the rotation of molds in the mold apparatus according to an embodiment of the present disclosure.

In FIGS. 13 and 14, the design and shape of a molded product S2 are schematically illustrated for conceptual description of the definition of elongation and changes in elongation. The design and shape of the molded product S2 illustrated in FIGS. 13 and 14 may be different from actual design and shape of a molded product that may be molded using the mold apparatus of the present disclosure.

First, as illustrated in FIG. 13, required elongation may be defined as a percentage value (%) of the ratio of the design length (i.e., the cross-sectional length of a deformed skin) of a molded product (i.e., a product produced after molding) S2 with respect to the input length (i.e., the cross-sectional length of an unmolded skin fabric) of a material to be molded (e.g., an unmolded skin fabric) S1.

For example, when the input length of the unmolded skin fabric is 225 mm and the design length of the skin after the molding is 370 mm, the required elongation is $(370/225)\times 100(\%)=165\%$.

In addition, when the molds are in the rotated state, the elongation may be variously adjusted depending on the rotated angle of the molds, i.e., the tilt angle. As illustrated in FIG. 14, when the molds are rotated to −18°, the elongation (%) may be calculated to be a value of $(b/a)\times 100$. When the molds are rotated to +18°, the elongation (%) may be calculated to be a value of $(d/c)\times 100$. Here, "a" and "b" are input lengths (i.e., unmolded lengths), whereas "b" and "c" are design lengths (i.e., lengths after the molding).

For example, where a=125.156 mm, b=338.325 mm, c=303.549 mm, and d=367.106 mm, when the molds are rotated to −18°, the elongation is 270%, and when the molds are rotated to +18°, the elongation is 120%.

As described above, as tilt angle (i.e., the mold setting angle) in which the molds are rotated changes, the elongation may be variously adjusted in the molding of the material to be molded S1. Furthermore, when the mold apparatus according to the present disclosure is used, it is possible to mold products with a level of elongation that cannot be obtained in the related-art mold apparatus.

As set forth above, In the rotatable mold apparatus according to the present disclosure, it is possible to mold products having a variety of designs and shapes from a plurality of skin materials (i.e., fabrics) having different levels of elongation using a single mold apparatus by rotating molds and changing a setting angle of molds, thereby significantly reducing a mold cost and an investment cost.

In addition, a modification, change, or fabrication of molds for preventing a molding defect in a product is not required. It is possible to prevent a mold investment cost, improve the degree of freedom of the design and shape of molds, and reduce a mold cost.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A rotatable mold apparatus comprising:

a first mold disposed on a first base structure and configured to move together with the first base structure;

a second mold disposed on a second base structure and configured to move together with the second base structure in order to couple to or decouple from the first mold;

a drive device installed between the first mold and the first base structure and connected to the first mold; and support devices rotatably supporting the first mold and the second mold on the first base structure and the second base structure, respectively, wherein the drive device is configured to rotate the first mold relative to the first base structure in order to rotate the first mold and the second mold coupled to the first mold when the first mold and the second mold are in a mold-closed state, wherein the drive device is configured to rotate the first mold and the second mold about a central point, which is the central point of an entirety of the first mold and the second mold in the mold-closed state, wherein the first mold and the second mold are set to a mold setting angle at which the first and second molds are rotatable by the drive device, and, while the set mold setting angle is maintained, the first mold and the first base structure are movable together, and the second mold and the second base structure are movable together, thereby opening and closing the first mold and the second mold, and wherein the drive device comprises:

a screw shaft horizontally disposed to be supported on the first base structure by a bracket, the screw shaft configured to receive a rotating force;

a nut engaged with the screw shaft;

a moving block fixed to the nut to move together with the nut;

a guide rail disposed on the first base structure and parallel to the screw shaft, wherein the moving block is coupled to the guide rail such that a movement of the moving block is guided by the guide rail; and a pivot shaft disposed on the first mold, wherein the pivot shaft coupled to the moving block allows the first mold to rotate in response to the movement of the moving block.

2. The rotatable mold apparatus of claim 1, wherein the first mold comprises a lower mold to be vertically moved up and down, wherein the second mold comprises an upper mold to be vertically moved up and down, and wherein a material to be molded is insertable between the lower mold and the upper mold when the first mold and the second mold are decoupled from each other.

3. The rotatable mold apparatus of claim 2, wherein the first base structure comprises a first base plate horizontally disposed below the first mold, and wherein the second base structure comprises a second base plate horizontally disposed above the second mold.

4. The rotatable mold apparatus of claim 1, wherein the support devices comprise:

a first support device disposed between the first base structure and the first mold to rotatably support the first mold on the first base structure; and a second support device disposed between the second base structure and the second mold to rotatably support the second mold on the second base structure.

5. The rotatable mold apparatus of claim 4, wherein the first support device comprises:

a first support block fixed to the first base structure;

a first guide block fixed to the first support block;

a first rotating block fixed to the first mold and coupled to the first support block and the first guide block; and bearings interposed between the first rotating block and the first support block and between the first rotating block and the first guide block, the bearings to support the first rotating block while the first rotating block slides on the first support block.

6. The rotatable mold apparatus of claim 5, wherein a support surface of the first support block comprises a curved surface having a shape of a concave arc, wherein a plurality of first bearings is arranged on the concave arc along the support surface so that at least a portion of each of the first bearings protrudes from the support surface, and wherein the first rotating block comprises a curved slide surface having a shape of a convex arc such that the first rotating block slides in a state in which the curved slide surface thereof is seated on the plurality of first bearings.

7. The rotatable mold apparatus of claim 6, wherein the first rotating block comprises an arc-shaped guide groove, and wherein the first guide block comprises a second bearing to be inserted into and coupled to the arc-shaped guide groove so as to support the first rotating block.

8. The rotatable mold apparatus of claim 5, further comprising an indicator on the first guide block and a scale on the first mold such that a pointer of the indicator indicates a graduation of the scale corresponding to an angle to which the first mold is currently rotated.

9. The rotatable mold apparatus of claim 8, wherein the indicator has a hole through which a bolt extends and the first mold has a fastening hole to which the bolt is fastened such that, in a state in which the rotation of the first mold and the second mold is completed, the first mold is fixed to the indicator by the bolt and fastened to the fastening hole of the first mold.

10. The rotatable mold apparatus of claim 4, wherein the second support device comprises:

a second support block fixed to the second base structure;

a second guide block fixed to the second support block;

a second rotating block fixed to the second mold and coupled to the second support block and the second guide block; and bearings interposed between the second rotating block and the second support block and between the second rotating block and the second guide block, the bearings to support the second rotating block while the second rotating block slides on the second support block.

11. The rotatable mold apparatus of claim 10, wherein a support surface of the second support block comprises a curved surface having a shape of a concave arc, wherein a plurality of first bearings is arranged on the concave arc along the support surface so that at least a portion of each of the first bearings protrudes from the support surface, and wherein the second rotating block comprises a curved slide surface having a shape of a convex arc such that the second rotating block slides in a state in which the curved slide surface thereof is seated on the plurality of first bearings.

12. The rotatable mold apparatus of claim 11, wherein the second rotating block comprises an arc-shaped guide groove, and wherein the second guide block comprises a second bearing to be inserted into and coupled to the arc-shaped guide groove so as to support the second rotating block.

13. The rotatable mold apparatus of claim 10, further comprising an indicator on the second guide block and a scale on the second mold such that a pointer of the indicator indicates a graduation of the scale corresponding to an angle to which the second mold is currently rotated.

14. The rotatable mold apparatus of claim 13, wherein the indicator has a hole through which a bolt extends and wherein the second mold has a fastening hole to which the bolt is fastened such that, in a state in which a rotation of the first mold and the second mold is completed, the second mold is fixed to the indicator by the bolt extending through the hole of the indicator and fastened to the fastening hole of the second mold.

15. The rotatable mold apparatus of claim 1, further comprising:

a handle on the screw shaft to apply a rotating force thereto; or a motor shaft connected to the screw shaft to apply a rotating force thereto.

16. The rotatable mold apparatus of claim 1, wherein the moving block has a vertically extending recess, and wherein the pivot shaft is rotatably inserted into the recess of the moving block and is movable along the vertically extending recess of the moving block.

17. A rotatable mold apparatus comprising:

a first mold disposed on a first base structure and configured to move together with the first base structure;

a second mold disposed on a second base structure and configured to move together with the second base structure in order to couple to or decouple from the first mold;

a drive device installed between the first mold and the first base structure and connected to the first mold; and support devices rotatably supporting the first mold and the second mold on the first base structure and the second base structure, respectively, wherein the drive device is configured to rotate the first mold relative to the first base structure in order to rotate the first mold and the second mold coupled to the first mold when the first mold and the second mold are in a mold-closed state, wherein the drive device is configured to:

rotate the first mold and the second mold about a central point, which is the central point of an entirety of the first mold and the second mold in the mold-closed state, and set the first mold and the second mold to a mold setting angle at which the first mold and the second mold are rotated, wherein the rotatable mold apparatus is configured to maintain the set mold setting angle while the first mold and the first base structure move together, and the second mold and the second base structure move together so that the first mold and the second mold open and close, and wherein the drive device comprises:

a screw shaft horizontally disposed to be supported on the first base structure by a bracket, the screw shaft configured to receive a rotating force;

a nut engaged with the screw shaft;

a moving block fixed to the nut to move together with the nut;

a guide rail disposed on the first base structure and parallel to the screw shaft, wherein the moving block is coupled to the guide rail such that a movement of the moving block is guided by the guide rail; and a pivot shaft disposed on the first mold, wherein the pivot shaft coupled to the moving block allows the first mold to rotate in response to the movement of the moving block.

18. The rotatable mold apparatus of claim 17, wherein the support devices comprise a first support device and a second support device, wherein the first support device is disposed between the first base structure and the first mold to rotatably support the first mold on the first base structure, and wherein the first support device comprises a first support block fixed to the first base structure, a first guide block fixed to the first support block, a first rotating block fixed to the first mold and coupled to the first support block and the first guide block and bearings interposed between the first rotating block and the first support block and between the first rotating block and the first guide block, the bearings to support the first rotating block while the first rotating block slides on the first support block.

19. The rotatable mold apparatus of claim 17, wherein the pivot shaft is horizontally disposed in a transverse direction below the first mold, and wherein both ends of the pivot shaft are supported on a bottom portion of the first mold by brackets.

20. A rotatable mold apparatus comprising:

a first mold disposed on a first base structure and configured to move together with the first base structure;

a second mold disposed on a second base structure and configured to move together with the second base structure in order to couple to or decouple from the first mold;

a drive device installed between the first mold and the first base structure and connected to the first mold; and support devices rotatably supporting the first mold and the second mold on the first base structure and the second base structure, respectively, wherein the drive device is configured to rotate the first mold relative to the first base structure in order to rotate the first mold and the second mold coupled to the first mold when the first mold and the second mold are in a mold-closed state, wherein the drive device is configured to:

rotate the first mold and the second mold about a central point, which is the central point of an entirety of the first mold and the second mold in the mold-closed state, and set the first mold and the second mold to a mold setting angle at which the first mold and the second mold are rotated, wherein the rotatable mold apparatus is configured to maintain the set mold setting angle while the first mold and the first base structure move together, and the second mold and the second base structure move together so that the first mold and the second mold open and close, wherein the drive device comprises:

a screw shaft horizontally disposed to be supported on the first base structure by a bracket, the screw shaft configured to receive a rotating force;

a nut engaged with the screw shaft;

a moving block fixed to the nut to move together with the nut;

a guide rail disposed on the first base structure and parallel to the screw shaft, wherein the moving block is coupled to the guide rail such that a movement of the moving block is guided by the guide rail; and a pivot shaft disposed on the first mold, wherein the pivot shaft coupled to the moving block allows the first mold to rotate in response to the movement of the moving block, and wherein the moving block has a vertically extending recess, and the pivot shaft is rotatably inserted into the recess and is movable along the recess.

* * * * *